United States Patent
Fong

(10) Patent No.: US 9,449,433 B2
(45) Date of Patent: Sep. 20, 2016

(54) SYSTEM FOR REPRODUCING VIRTUAL OBJECTS

(71) Applicant: Ming Fong, Hong Kong (HK)

(72) Inventor: Ming Fong, Hong Kong (HK)

( * ) Notice: Subject to any disclaimer, the term of this patent is extended or adjusted under 35 U.S.C. 154(b) by 0 days.

(21) Appl. No.: 15/064,624

(22) Filed: Mar. 9, 2016

(65) Prior Publication Data
US 2016/0189434 A1    Jun. 30, 2016

Related U.S. Application Data

(63) Continuation-in-part of application No. 13/527,592, filed on Jun. 20, 2012, now abandoned.

(60) Provisional application No. 61/602,036, filed on Feb. 22, 2012.

(51) Int. Cl.
*G06T 19/20* (2011.01)
*G06T 19/00* (2011.01)
*G06F 3/01* (2006.01)
*G06F 3/03* (2006.01)

(52) U.S. Cl.
CPC .............. *G06T 19/20* (2013.01); *G06F 3/011* (2013.01); *G06F 3/0317* (2013.01); *G06T 19/006* (2013.01)

(58) Field of Classification Search
CPC .. G06T 11/001; G09B 11/10; G06F 3/03545
See application file for complete search history.

(56) References Cited

U.S. PATENT DOCUMENTS

2004/0106916 A1*  6/2004  Quaid .................... A61B 34/20
                                                    606/1
2009/0237763 A1    9/2009  Kramer et al.

FOREIGN PATENT DOCUMENTS

NL             1020440 C2    10/2003

OTHER PUBLICATIONS

Flagg et al., Projector-Guided Painting, UIST'06, Oct. 15-18, 2006, pp. 235-243.*
European Search Report of counterpart European Patent Application No. 13155725.8 issued on Jul. 7, 2016.

* cited by examiner

*Primary Examiner* — Haixa Du

(57) ABSTRACT

A system for reproducing virtual objects includes a detector device that carries a known tracking pattern or tracking feature; and a host device configured for virtually reproducing a template pattern to a surface and producing an image combining the tracking pattern and the template pattern. The template pattern corresponds to a virtual object. The host device is configured to process the image and thereby transmit information regarding the geometrical relationship between the tracking pattern and the template pattern to a user so that the user can reproduce the virtual object on the surface based on the information.

20 Claims, 58 Drawing Sheets

SYSTEM FOR REPRODUCING VIRTUAL OBJECTS

CROSS REFERENCE TO RELATED APPLICATION

This application is a Continuation-In-Part Application of U.S. patent application Ser. No. 13/527,592 filed on Jun. 20, 2012 which claims benefit to U.S. Provisional Patent Application Ser. No. 61/602,036, entitled "system for reproducing a virtual object and measuring the displacement between a physical object and the virtual object" filed Feb. 22, 2012, the contents of which are incorporated herein in their entirety for all purposes.

FIELD OF THE PATENT APPLICATION

The present patent application generally relates to electronic systems for producing virtual objects and more specifically to a system that produces virtual objects and is capable of maintaining the exact relative coordinate properties of the virtual objects and being conveniently utilized in applications such as computer assisted drawing.

BACKGROUND

Optical projection is sometimes used in reproducing a virtual object on a surface (2D or 3D surface) such as a wall with a projected image so that a painter can paint the wall according to the projected image. In a typical setup for wall painting, an optical projector is connected with a computer and an application running by the computer projects a virtual object in the form of a digital image to the wall via the optical projector. A user goes to the wall with a pencil in hand and uses his eyes to find the digital image. The user can thereby reconstruct the virtual object on the wall with the digital image that he sees and the pencil. With such a system, it is often desired to maintain the exact relative coordinate properties of the virtual object in the reproduction process. For a system for reproducing virtual objects, it is also desired to be able to measure the displacement between a physical object and a virtual object reproduced on the same physical space.

SUMMARY

The present patent application is directed to a system for reproducing virtual objects. In one aspect, the system includes a detector device that carries a known tracking pattern or tracking feature; and a host device configured for virtually reproducing a template pattern to a surface and producing an image combining the tracking pattern and the template pattern. The template pattern corresponds to a virtual object. The host device is configured to process the image and thereby transmit information regarding the geometrical relationship between the tracking pattern and the template pattern to a user so that the user can reproduce the virtual object on the surface based on the information.

The host device may include a host camera and a host computer connected with the host camera. The host camera may be configured to produce the image and the host computer may be configured to process the image.

The detector device may include a tracking object and a communication device. The tracking object may carry the tracking pattern or the tracking feature and include a button for the user to push and thereby mark on the surface. The communication device may be configured to communicate between the host device and the user. The communication device may be a smart phone being configured to receive the information transmitted from the host device and to pass the information to the user.

The host device may be further configured to transmit properties of the virtual object to the user, the properties being related to the relative position of the tracking pattern relative to the template pattern in the image. The properties may include type, coordinates, dimension, material, color or texture.

The host device may be configured to transform the tracking pattern to a virtual tracking object represented by a matrix, to manipulate the template pattern in a virtual space, and to superposition the transformed tracking pattern and the manipulated template pattern in producing the image. The host device may be configured to scale, rotate or relocate the template pattern in the virtual space in manipulating the template pattern. The host device may be configured to manipulate the template pattern based on the user's perception. The host device may be configured to manipulate the template pattern based on systematic calibration.

The host device may further include a calibration sensor configured to provide additional information to the host computer, and the calibration sensor may be a GPS unit, a level sensor, a gyroscope, a proximity sensor, or a distance sensor.

The system for reproducing virtual objects may further include a plurality of the detector devices. Each of the detector devices may be configured to communicate between the host device and one of a plurality of users so that the users can collectively reproduce the virtual object on the surface.

In another aspect, the system for reproducing virtual objects includes a detector device that carries a tracking pattern; and a host device configured for reproducing a template pattern to a surface and producing an image combining the tracking pattern and the template pattern. The template pattern corresponds to a virtual object. The host device is configured to process the image and thereby transmit information regarding the geometrical relationship between the tracking pattern and the template pattern to a user through the detector device.

The host device may include a host camera being configured to produce the image. The host camera may include an adjustable focal length system. The tracking pattern or the tracking feature of the detector device may be fixedly attached with the surface. The detector device and the surface may be movable relative to the host camera along an optical axis of the host camera.

In yet another aspect, the system for reproducing virtual objects includes a surface; a detector device that carries or produces a tracking pattern; a host device configured for virtually reproducing a template pattern to the surface and producing an image combining the tracking pattern and the template pattern; and a computer unit. The template pattern corresponds to a virtual object; and the computer unit is configured to process the image and thereby transmit or utilize information regarding the relative position of the tracking pattern relative to the template pattern.

The host device may include an optical system configured to capture light in a predetermined frequency spectrum and a digital light sensor configured to sense light within the predetermined frequency spectrum.

The tracking pattern may be a colored dot, and in producing the image the host device may be configured to transform the colored dot to a zero dimensional object in a virtual space.

The tracking pattern may be a passive pattern that reflects ambient light or light emitted from a light source, or an active pattern configured to emit light.

BRIEF DESCRIPTIONS OF THE DRAWINGS

DETAILED DESCRIPTION

Reference will now be made in detail to a preferred embodiment of the system for reproducing virtual objects disclosed in the present patent application, examples of which are also provided in the following description. Exemplary embodiments of the system for reproducing virtual objects disclosed in the present patent application are described in detail, although it will be apparent to those skilled in the relevant art that some features that are not particularly important to an understanding of the system for reproducing virtual objects may not be shown for the sake of clarity.

Furthermore, it should be understood that the system for reproducing virtual objects disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
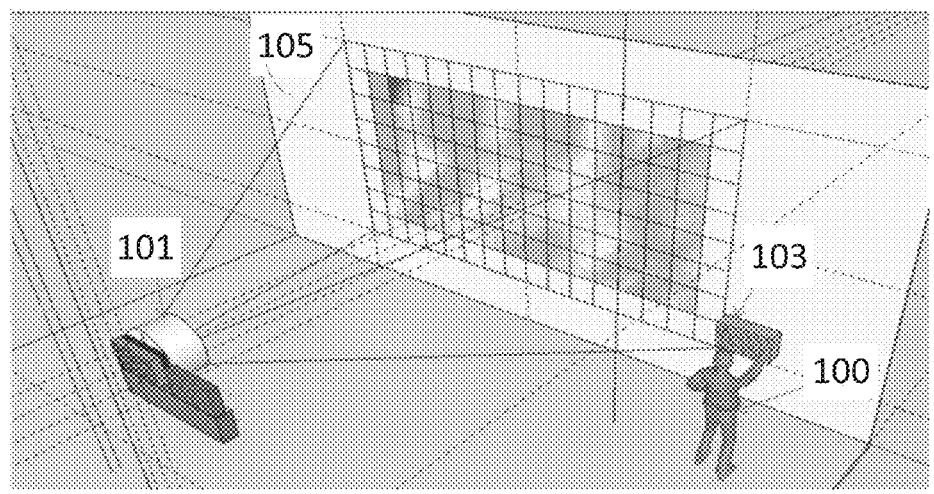
FIG. 1 illustrates a system for reproducing virtual objects according to an embodiment of the present patent application.

FIG. 1 illustrates a system for reproducing virtual objects according to an embodiment of the present patent application. Referring to FIG. 1, the system, being operated by a user 100, includes a host device 101, a detector device 103 and a surface 105. The surface 105 is the physical surface on which the detector device 103 on this surface can be detected by the host device 101. The host device 101 is configured to process the information from the user 100 or a sensor device attached to the host device 101, and to deliver relevant information (including raw information such as the captured image, the attached sensor value and augmented information such as templates, detector device positions and etc.) back to the user. The detector device 103 is configured to be tracked by the host device 101 of its position, and to send and receive information between the user 100 and the host device 101.

Figure 2:
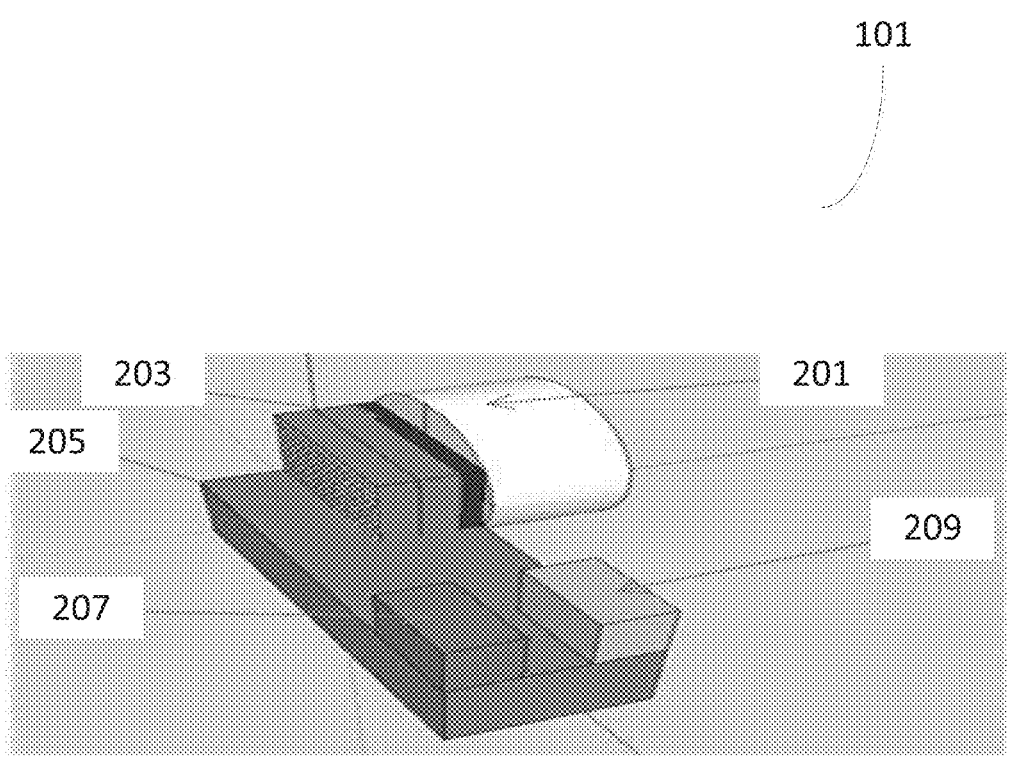
FIG. 2 illustrates the host device of the system for reproducing virtual objects depicted in FIG. 1.

FIG. 2 illustrates the host device 101 of the system for reproducing virtual objects depicted in FIG. 1. Referring to FIG. 2, the host device 101 includes an optical system 201, a digital light sensor 203, a computer unit 205, a communication unit 207, and a calibration sensor 209. The optical system is configured to capture the image on the physical surface and the image can be sensed by the digital light sensor 203. The light captured by the optical system 201 that produces the image may be in any frequency spectrum such as visible light, IR, x-ray, and etc. Correspondingly, the digital light sensor 203 is a visible light sensor, an IR sensor, an x-ray sensor, and etc. The digital light sensor 203 is configured to convert the light image to a mathematical matrix that is perceived by the computer unit 205. The digital light sensor may be a CCD sensor, a CMOS sensor, a light field sensor and etc. The matrix may be 1D, 2D or 3D. The communication unit 207 is configured to communicate with the detector device 103 or other peripheral devices. The calibration sensor 209 is configured to provide addition information to the computer unit 205 to enhance the application. The calibration sensor 209 may be a GPS unit, a level sensor, a gyroscope, a proximity sensor, a distance sensor and etc. It is understood that, in another embodiment, the computer unit 205 may be not a part of the host device 101, and attached to the detector device 103 instead. The computer unit 205 may be a standalone device in an alternative embodiment.

Figure 3:
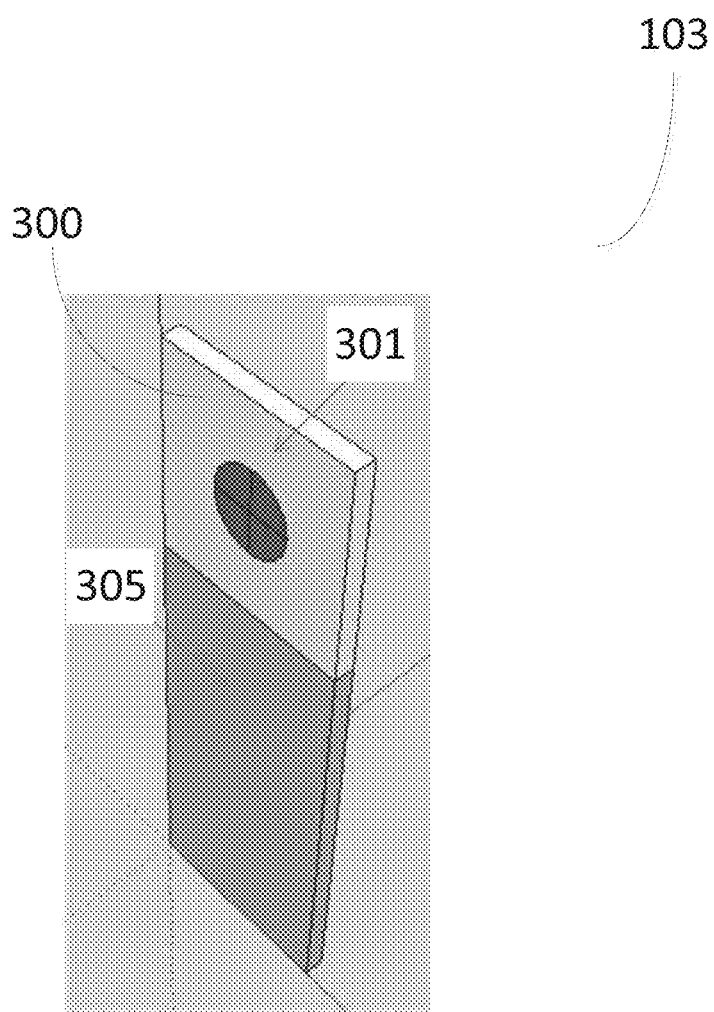
FIG. 3 illustrates the detector device of the system for reproducing virtual objects depicted in FIG. 1.

FIG. 3 illustrates the detector device 103 of the system for reproducing virtual objects depicted in FIG. 1. Referring to FIG. 3, the detector device 103 includes a tracking object 300 that carries a tracking pattern or feature 301 that can be detected by the host device 101 and allows the host device 101 to transform it to a 0D object (or alternatively a 1D, 2D or 3D object) in the virtual space. The pattern can be as simple as a red dot on a piece of paper as shown in FIG. 3. The pattern can be a passive pattern that reflects light from the ambient or from a light source (such as a laser), or an active pattern that emits light by itself. The tracking feature can be any known feature of the tracking object such as the tip of a pen, a fingertip or an outline of a known object. The detector device 103 further includes a communication device 305 that is configured to communicate between the user 100 and the host device 101. In this embodiment, the communication device is mobile phone. It is to be understood that the communication device can be as simple as the user's mouth and ears so that the host device 101 can pick up messages from the user's voice and the user can receive voice messages from the host device 101.

Figure 4:
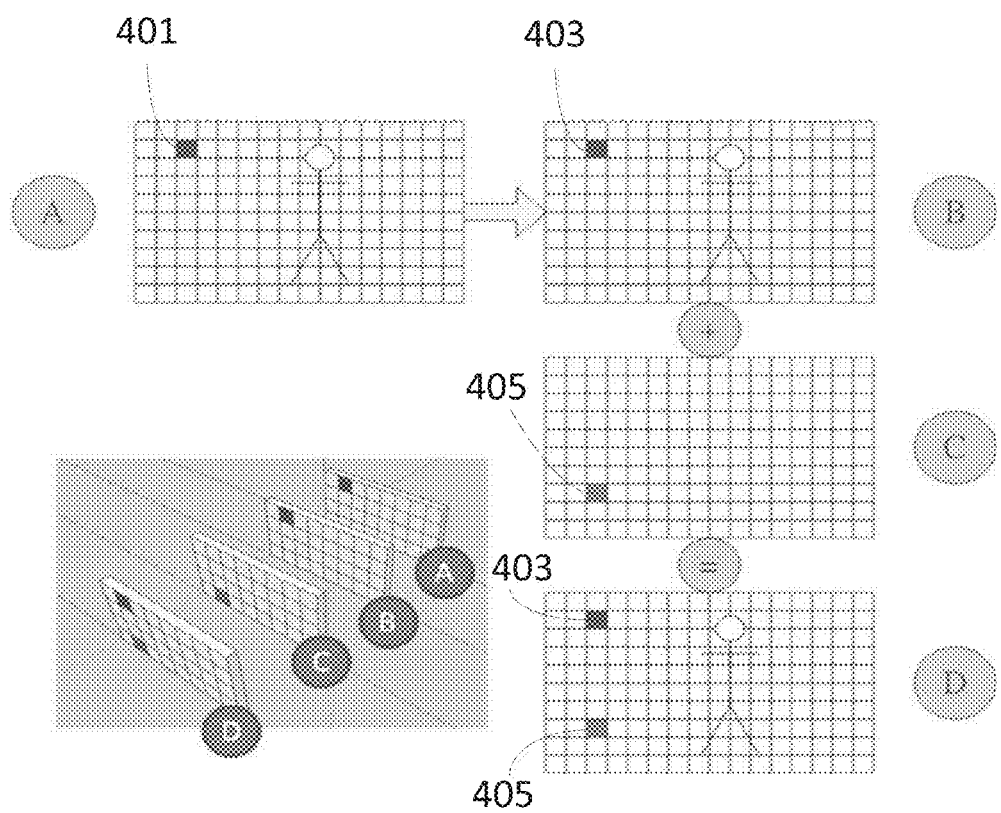
FIG. 4 illustrates the operation of the system for reproducing virtual objects depicted in FIG. 1 in reconstructing a blue virtual object on the same surface as the physical red dot.

FIG. 4 illustrates the operation of the system for reproducing virtual objects in this embodiment in reconstructing a blue virtual object (0D object) on the same surface as the physical red dot. Referring to FIG. 3 and FIG. 4, the red dot 301 (shown as 401 in the part A of FIG. 4) on the tracking object 300 is sensed by digital light sensor 203 and transformed by the computer unit 205 to a virtual tracking object represented by a matrix (shown as 403 in the part B of FIG. 4). The matrix can be 0D, 1D, 2D, or 3D depending on the type of sensor being used. The matrix is further transformed to a 0D object (for this illustration, the resolution of the 0D object is ONE unit of the matrix, and it can be lower than ONE unit by using a sub-pixel estimation algorithm) so that the red dot 301 is logically represented by a coordinate in either the physical space or virtual space. When the detector device 103 moves, the tracking object 300 moves, the red dot 301 moves, and the coordinates of the red dot 301 in the virtual space will change as well.

The part C of FIG. 4 shows the mathematical matrix created in the host device 101 having the same dimension as the part B and carrying the virtual blue object 405. The part D of FIG. 4 shows the superposition of the part B and the part C. When the coordinates of the virtual tracking object 403 (corresponding to the red dot 301) equal the coordinates of the virtual blue object 405, the host device 101 is configured to send a message to the user 100 so that the user 100 knows the exact coordinates of the blue object are reproduced to the physical surface. Then the user 100 can use a reconstruction device, such as a pencil, to reconstruct (to mark with the pencil, for example) this object to be reproduced on the surface. As a result, without using a projector and only by using the system including the host device 101 and the detector device 103, the virtual blue object is being perfectly reproduced in the physical world, which carries the exact relative coordinate properties between the blue object and the red dot in the virtual space.

In this embodiment, the message sent from the host device 101 to the user 100 is not limited to "when the red dot=the blue object". The host device 101 can also tell the user 100 the coordinate information of the blue object and the red dot, such as how close it is between the two objects. The content of the message is not limited to the coordinate information as well. It may include additional properties of the virtual object, such as information regarding the type, dimension, material, color, texture, and etc. Such additional information may also be sent from the host device 101 to the detector device 103 via the communication device 305.

The system for reproducing virtual objects in this embodiment requires a calibration process to link the properties, such as orientation, dimension, surface leveling and etc., between the physical space and the virtual space. Depending on the specific application, the calibration can be as simple as using the user's perception or using a calibration device.

Figure 5:
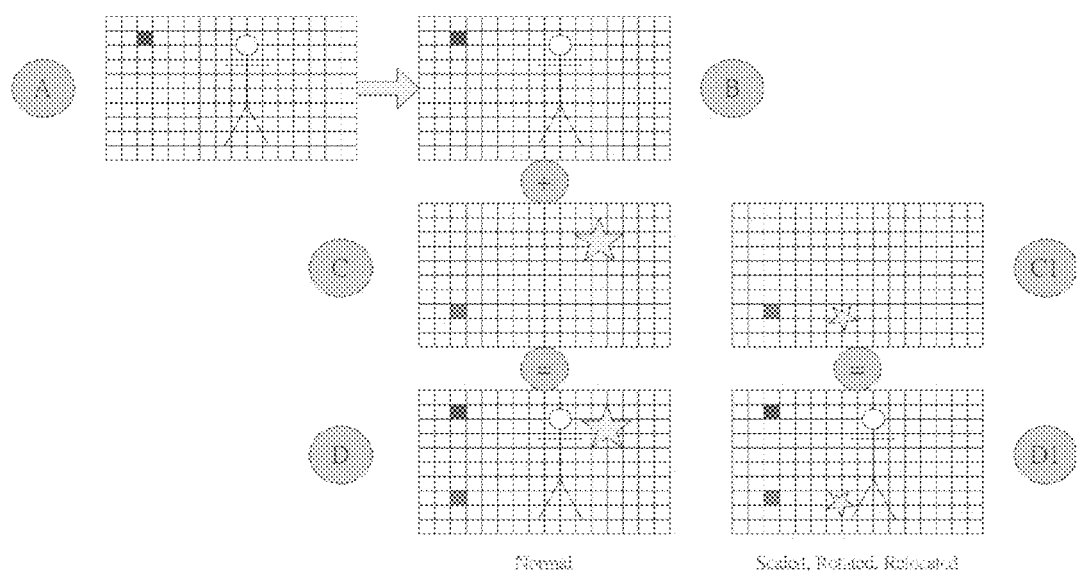
FIG. 5 illustrates a calibration process of the system for reproducing virtual objects depicted in FIG. 1 that does not require any calibration device.

If the application does not require following any strict rules on physical properties, the reproduced object's coordinates, orientation and scale may purely rely on the user' perception and no calibration device is needed. FIG. 5 illustrates a calibration process that does not require any calibration device. Referring to FIG. 5, the star is the virtual object to be reproduced to the physical surface. "C" is the initial virtual object. "C1" is the virtual object scaled, rotated and/or relocated in the virtual space based on the user's perception. In this case the exact orientation, scale and coordinate properties of the star object reproduced on the physical surface are not important. The most important is what the user perceives to be the best orientation, scale and position of the virtual object on the physical surface.

If the application requires following some strict rules on physical properties, then a calibration device is needed. To link the scales of the physical coordinate system with the virtual coordinate system, the scaling between the basic unit of the physical and virtual coordinate system is required to be known. For easy illustration, millimeter is used as the dimension in physical coordinate system. Then the system needs to know how many units in the virtual space is equivalent to 1 mm in the physical space.

Figure 6:
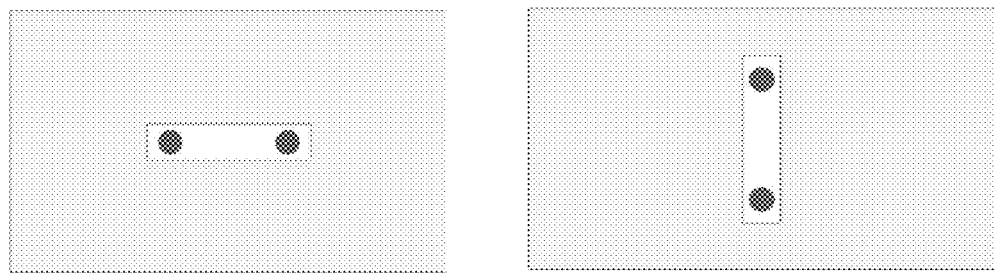
FIG. 6 illustrates the process of calibrating the scaling between the physical space and the virtual space.

FIG. 6 illustrates the process of calibrating the scaling between the physical space and the virtual space. Referring to FIG. 6, the calibration requires a device that carries two tracking objects (the two red dots as shown in FIG. 6). The distance between the two tracking object is predefined, for example 1m or 1000 mm. The system then calculates the distance between the two tracking objects in the virtual space, for example, to be d units. Then, we know 1000 mm in the physical space=d units in the virtual space, or 1 units in the virtual space=1000/d mm in the physical space, wherein "d" does not need to be an integer and it can be a floating point number which depends on the resolution of the coordinate transformation algorithm that transforms the captured tracking object to the coordinates. The calibration needs to be done in the horizontal and vertical axes as shown in FIG. 6.

Figure 7:
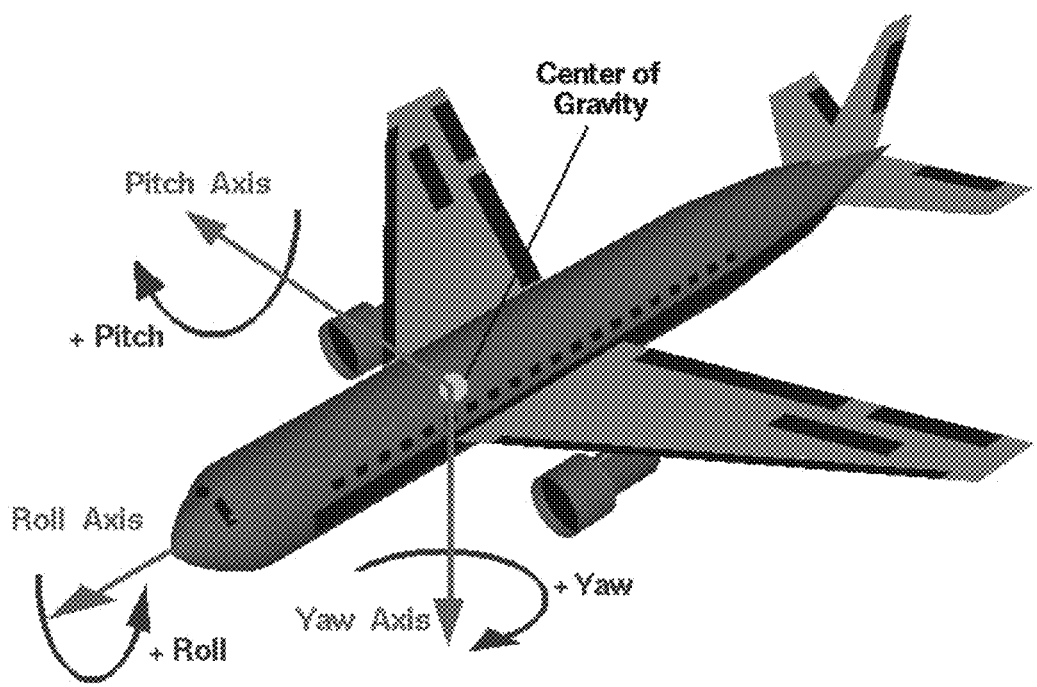
FIG. 7 illustrates the angular errors with the aircraft coordinates.
Figure 7:
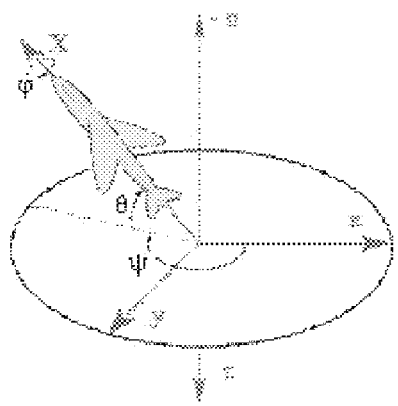
Figure 8:
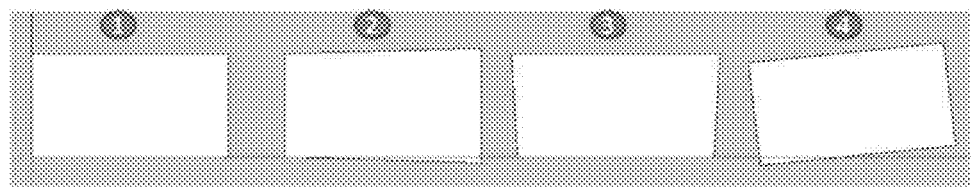
FIG. 8 illustrates images with different types of angular errors.

Another aspect of the calibration is related to the orientation of the coordinate system. The target surface on which a virtual object will be reproduced may not be perfectly parallel to the digital light sensor. In fact, there is always an angular error in practical use which will affect the accuracy. FIG. 7 illustrates the angular errors with the aircraft coordinates. Referring to FIG. 7, the center of the gravity is the digital light sensor. The target surface is located right in front of the airplane head. The angular errors are defined as the following:

Roll—$\phi$: rotation about the X-axis
Pitch—$\theta$: rotation about the Y-axis
Yaw—$\psi$: rotation about the Z-axis FIG. 8 illustrates images with different types of angular errors. Referring to FIG. 8, the image 1 has no angular error. The image 2 has an angular error in the Yaw axis. Image 3 has an angular error in the Pitch axis. The image 4 has an angular error in the Roll axis.

Figure 9:
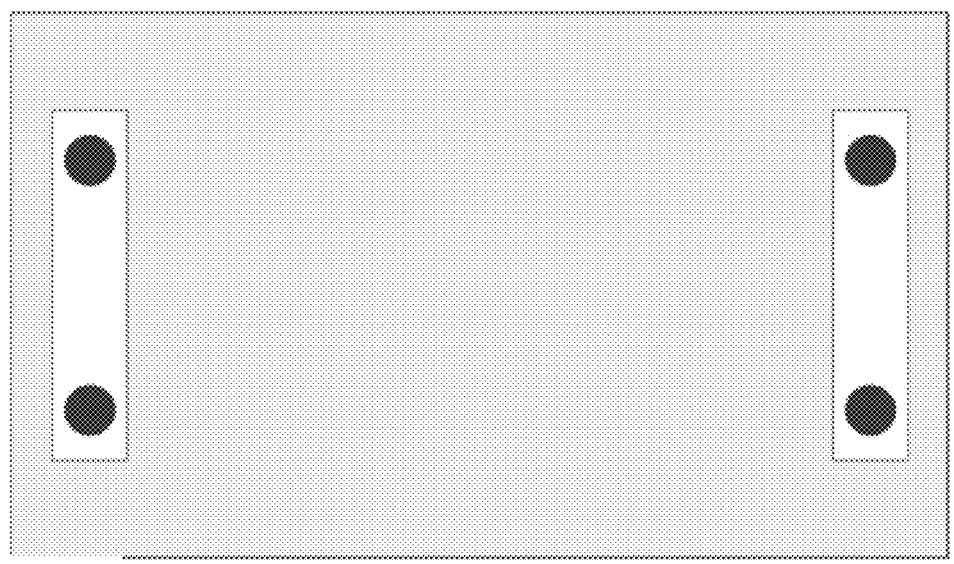
FIG. 9 illustrates the calibration of the Yaw error.

FIG. 9 illustrates the calibration of the Yaw error. Referring to FIG. 9, to calibrate the Yaw error, a calibration target is disposed at the left hand side of the field of view (FOV) and the virtual distance (dL) is calculated. The calibration target is then moved to the right hand side of the FOV and the virtual distant (dR) is calculated. The system can calibrate the Yaw error based on the ratio of dL and dR.

Figure 10:
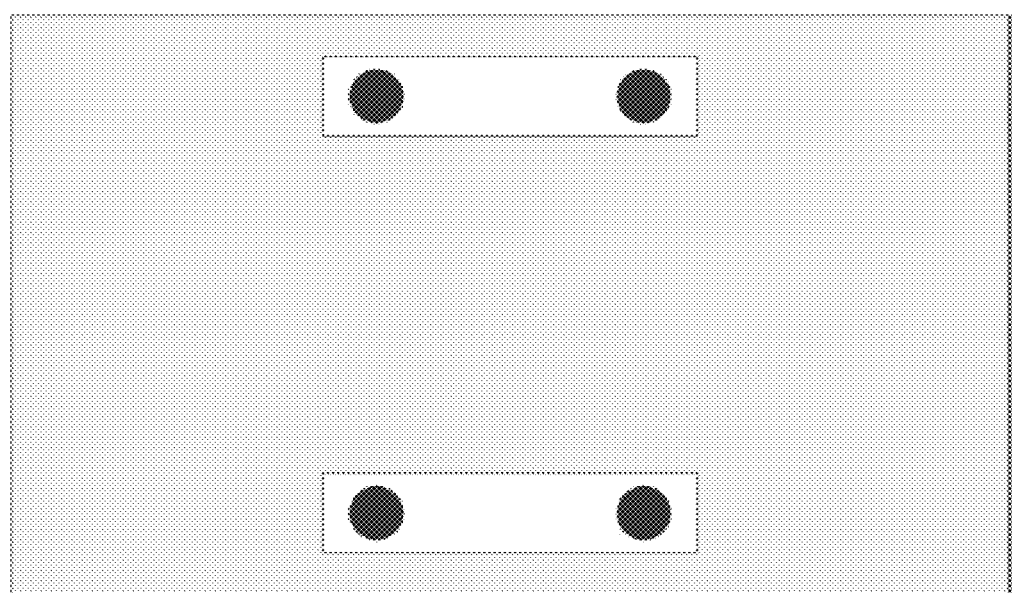
FIG. 10 illustrates the calibration of the Pitch error.

FIG. 10 illustrates the calibration of the Pitch error. Referring to FIG. 10, to calibrate the Pitch error, a calibration target is disposed at the bottom side of the FOV and the virtual distance (dB) is calculated. Then the calibration target is moved to the top side of the FOV and the virtual distance (dT) is calculated. The system can calibrate the Pitch error based on the ratio of dB and dT. If the wall has a known pitch angle (a vertical wall has zero pitch angle) with respected to a leveled surface, then a digital level sensor attached to the host device can also be used to calibrate the Pitch error.

Figure 11A:
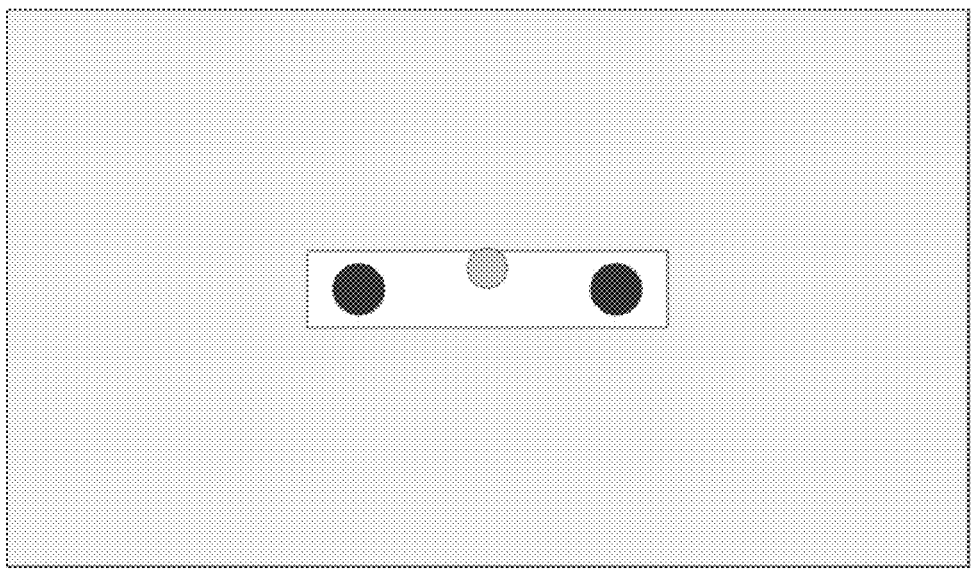
FIG. 11A illustrates the calibration of the Roll error.

FIG. 11A illustrates the calibration of the Roll error. Referring to FIG. 11A, the Roll error can be calibrated by either a level sensor attached to a calibration target or a level sensor attached to the host device. To use the level sensor attached to a calibration target, the calibration target is disposed at the center of the FOV and the level sensor is aligned until it is level. The angle between the two dots in the virtual space is the Roll error. To calibrate the Roll error by a digital level sensor attached to the host device, the computer unit is configured to read the Roll error directly from the digital level sensor. This method uses mathematics to correct the angular error between the host device and the target surface.

Figure 11B:
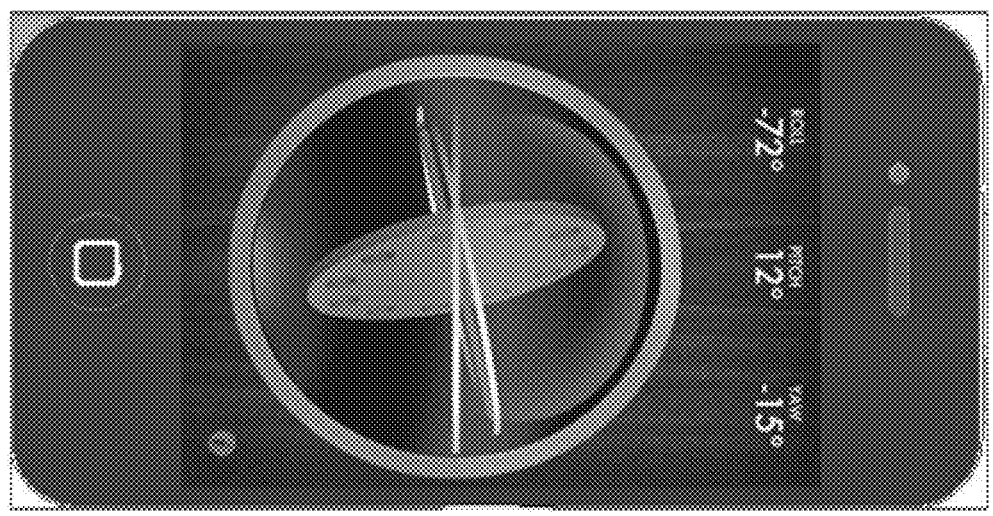
FIG. 11B illustrates a smartphone equipped with a gyroscope.

FIG. 11B illustrates a smartphone equipped with a gyroscope. Gyroscope is very common in today's consumer electronics. Most smartphones are already equipped with the gyroscope. If a gyroscope is attached on the host device, the user can put the host device on the wall to capture the Roll, Pitch and Yaw figures of the wall, and then put the host device back to the tripod and align the tripod such that the Roll, Pitch and Yaw figures are equal to the wall's figures. This method aligns the host device so that there is no angular error between the host device and the target surface.

Figure 12A:
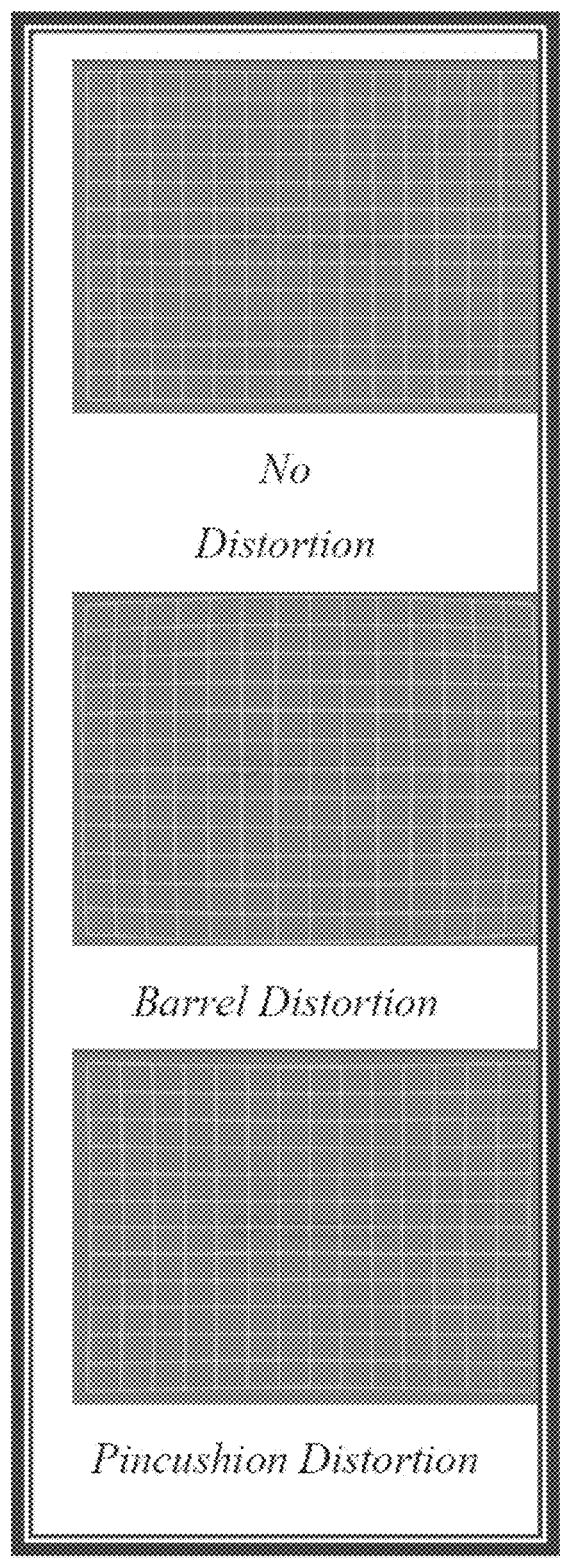
FIG. 12A illustrates images with different types of optical distortions.

FIG. 12A illustrates images with different types of optical distortions. Referring to FIG. 12A, the optical distortion happens when the lens represents straight lines as bent lines. This can be often seen in zoom lenses at both ends of the zoom range, where straight lines at the edge of the frame appear slightly curved. These distortions can be digitally corrected by a calibration process. It is required that the host device takes an image of a calibration target that contains multiple horizontal and vertical lines. Since the system knows the physical target pattern, so by comparing the captured pattern with the theoretical ideal pattern, a software correction algorithm can be developed to correct the distortion. Since the optical distortion is relatively stable once the optics is assembled to the system, a one-time factory/user calibration is enough.

System Accuracy

The system accuracy depends on following factors:
1. Physical dimension of the surface
2. Resolution of the Digital light sensor
3. Tracking pattern Let's assume we have following setup:
a. Physical surface with dimension 6 m×3.375 m (aspect ratio=16:9)
b. Digital light sensor with resolution=1920 pixels×1080 pixels
c. A point source tracking pattern which is represented by ONE pixel in the Digital light sensor output matrix.

Physical Resolution (mm)=6*1000/1920=3.13 mm

Here is the summary of the physical resolution for the most common digital video camera in the market.

| Digital Video Camera | Pixel Resolution | | Physical Resolution (mm) on a 6 meter wide surface |
|---|---|---|---|
| | Horizontal | Vertical | |
| 1080p | 1920 | 1080 | 3.13 |
| 720p | 1280 | 720 | 4.69 |
| VGA | 640 | 480 | 9.38 |
| 12MP | 4000 | 3000 | 1.50 |

Obviously, the accuracy increase as the Digital light sensor resolution increase and the accuracy increase as the Physical Dimension of the surface decreases.

System Accuracy Improvement

In reality, we cannot make a tracking pattern that always produces ONE pixel (0D object) in the Digital light sensor. The tracking pattern will always be a group of pixels in the digital light sensor which are represented by a 2D or 3D matrix. So a centroid estimation algorithm needs to be developed in order to find the centroid of the tracking pattern. Because of this nature, a sub-pixel centroid estimation algorithm is possible by analyzing the matrix represented tracking pattern, which means that the system accuracy can be improved by sub-pixel centroid estimation algorithm.

Sub-pixel estimation is a process of estimating the value of a geometric quantity to improve the pixel accuracy, even though the data is originally sampled on an integer pixel quantized space.

It is assumed that information at a scale smaller than the pixel level is lost when continuous data is sampled or quantized into pixels from e.g. time varying signals, images, data volumes, space-time volumes, etc. However, in fact, it may be possible to estimate geometric quantities to improve the pixel accuracy. The underlying foundations of this estimation include:
1. Models of expected spatial variation: discrete structures, such as edges or lines, producing characteristic patterns of data when measured, allowing fitting of a model to the data to estimate the parameters of the structure.
2. Spatial integration during sampling: sensors typically integrate a continuous signal over a finite domain (space or time), leading to measurements whose values depend on the relative position of the sampling window and the original structure.
3. Point spread function: knowledge of the PSF can be used, e.g. by deconvolution of a blurred signal, to estimate the position of the signal.

The accuracy of sub-pixel estimation depends on a number of factors, such as the image point spread function, noise levels and spatial frequency of the image data. A commonly quoted rule of thumb is 0.1 pixel, but a lower value is achievable by using more advanced algorithm The following are the common approaches for estimating sub-pixel positions.

Figure 12B:
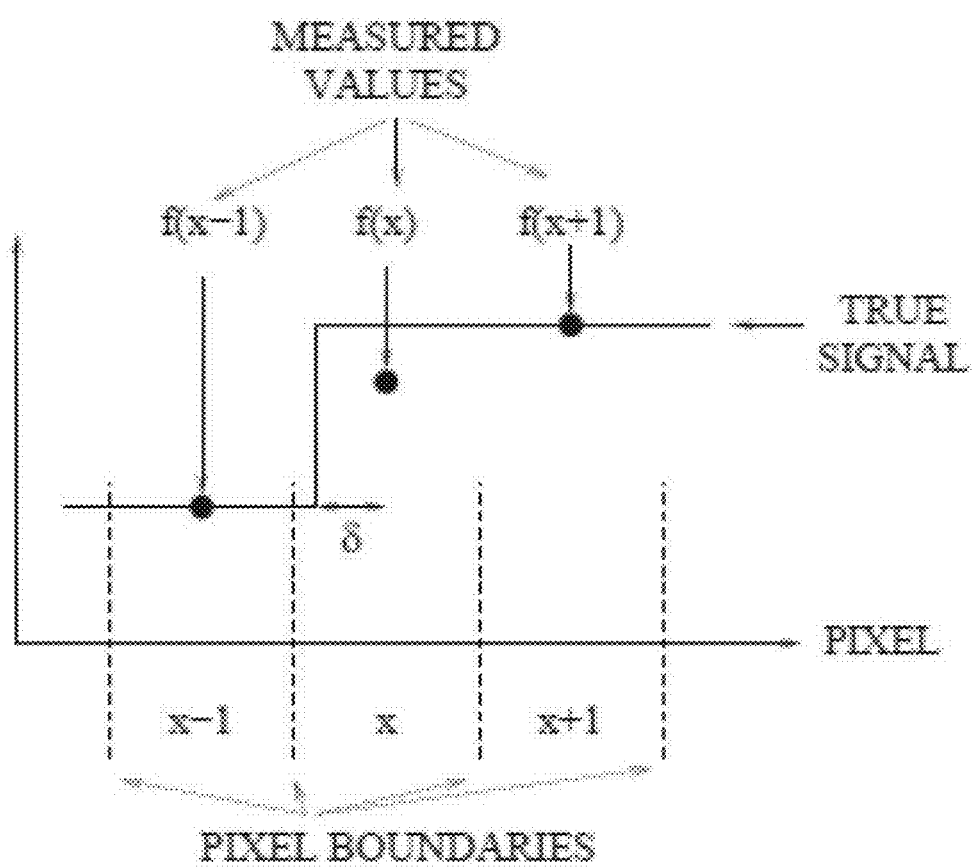
FIG. 12B illustrates an example of sub-pixel edge position estimation.

Interpolation:

An example is in sub-pixel edge position estimation, which is demonstrated here in one dimension in an ideal form in FIG. 12B. One can see that f(x) is a function of the edge's actual position within a pixel and the values at adjacent pixels. Here we assume that the pixel 'position' refers to the center of the pixel. Let δ be the offset of the true edge position away from the pixel center. Then, one can model the value f(x) at x in terms of the values at the neighbors, assuming a step function:

$$f(x)=(½+δ)*f(x-1)+(½-δ)*f(x+1)$$

from which we can solve for the subpixel edge position x+δ by:

$$δ = \frac{2f(x) - f(x-1) - f(x+1)}{2(f(x-1) - f(x+1))}$$

Another approach is to interpolate a continuous curve (or surface) and then find the optimal position on the reconstructed curve (e.g. by using correlation for curve registration).

Integration:

An example is the estimation of the center point of a circular dot, such as what is required for control point localization in a camera calibration scheme. The assumption is that the minor deviations from many boundary pixels can be accumulated to give a more robust estimate.

Suppose that g(x, y) are the grey levels of a light circle on a dark background, where (x, y) are in a neighborhood N closely centered on the circle. Assume also that the mean dark background level has been subtracted from all values. Then, the center of the dot is estimated by its grey-level center of mass:

$$\hat{x} = \frac{\sum (x, y) \in N^{xg(x,y)}}{\sum (x, y) \in N^{g(x,y)}}$$

and similarly for ŷ.

Averaging:

Averaging multiple samples to arrive at single measurement (and error) is a good way to improve the accuracy of the measurements. The premise of averaging is that noise and measurement errors are random, and therefore, by the Central Limit Theorem, the error will have a normal (Gaussian) distribution. By averaging multiple points, someone arrives at a Gaussian distribution. A mean can be calculated that is statistically close to the actual value. Furthermore, the standard deviation that you derive from the measurements gives the width of the normal distribution around the mean, which describes the probability density for the location of the actual value.

The standard deviation is proportional to 1/square root (N), where N is the number of samples in the average. Therefore, the more points that are taken in average, the smaller the standard deviation from the average will be. In other words, the more points are averaged, the more accurately someone will know the actual value.

There are a lot of centroid estimation algorithms that have been developed in the astronomy field and used to estimate the position of the star captured by the digital camera via the telescope.

In general, the centroid estimate algorithm can achieve 0.1 pixel resolution or better, then the physical resolution table becomes:

| Digital Video Camera | Pixel Resolution | | Physical Resolution (mm) on a 6 meter wide surface | Physical Resolution (mm) with centroid estimation algorithm |
|---|---|---|---|---|
| | Horizontal | Vertical | | |
| 1080p | 1920 | 1080 | 3.13 | 0.313 |
| 720p | 1280 | 720 | 4.69 | 0.469 |
| VGA | 640 | 480 | 9.38 | 0.938 |
| 12MP | 4000 | 3000 | 1.50 | 0.15 |

System Accuracy vs. Focus

Figure 12C:
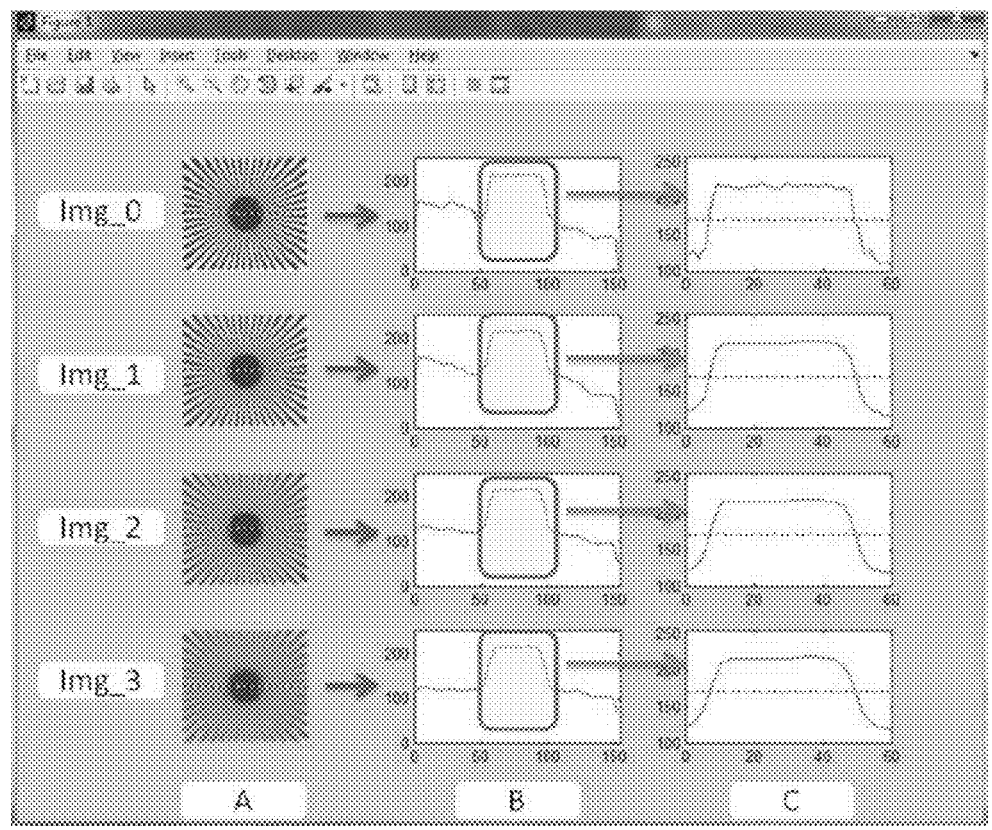
FIG. 12C shows a number of patterns that are analyzed using Matlab to evaluate the centroid coordinate with respected to focus shift.

FIG. 12C shows a number of patterns that are analyzed using Matlab to evaluate the centroid coordinate with respected to focus shift. FIG. 12C includes:

A: Images (img_0, img_1, img_2, img_3)
B: Center line of the images (img_0, img_1, img_2, img_3) (the intensity value is subtracted by 255 to convert the black dot to white dot)
C: Zoom in black spot area of B
  Img_0: perfectly focused image
  Img_1: image focus is shifted by ~0.5 DOF (Depth of Field)
  Img_2: image focus is shifted by ~1.0 DOF
  Img_3: image focus is shifted by ~1.5 DOF

| img_0 | | | | | |
|---|---|---|---|---|---|
| Pixel Location | 6.000 | 7.000 | | 50.000 | 51.000 |
| Pixel Amplitude | 133.000 | 178.000 | | 159.000 | 147.000 |
| Coordinate estimated by Nearest Pixel | 6.000 | | 28.000 | 50.000 | |
| Coordinate estimated by Linear Interpolation | 6.444 | | 28.472 | 50.500 | |

| img_1 | | | | | |
|---|---|---|---|---|---|
| Pixel Location | 6.000 | 7.000 | | 50.000 | 51.000 |
| Pixel Amplitude | 147.000 | 170.000 | | 163.000 | 148.000 |
| Coordinate estimated by Nearest Pixel | 6.000 | | 28.000 | 50.000 | |
| Coordinate estimated by Linear Interpolation | 6.261 | 51.757 | 28.464 | 50.667 | |

| img_2 | | | | | |
|---|---|---|---|---|---|
| Pixel Location | 6.000 | 7.000 | | 50.000 | 51.000 |
| Pixel Amplitude | 152.000 | 170.000 | | 162.000 | 148.000 |
| Coordinate estimated by Nearest Pixel | 6.000 | | 28.000 | 50.000 | |
| Coordinate estimated by Linear Interpolation | 6.056 | 51.757 | 28.349 | 50.643 | |

| img_3 | | | | | |
|---|---|---|---|---|---|
| Pixel Location | 5.000 | 6.000 | | 50.000 | 51.000 |
| Pixel Amplitude | 145.000 | 156.000 | | 163.000 | 151.000 |
| Coordinate estimated by Nearest Pixel | 5.000 | | 27.500 | 50.000 | |
| Coordinate estimated by Linear Interpolation | 5.727 | 51.757 | 28.280 | 50.833 | |

| | Centroid Coordinate estimated by | |
|---|---|---|
| | Linear Interpolation | Nearest Pixel |
| Average | 28.391 | 27.875 |
| Max | 28.472 | 28.000 |
| MM | 28.280 | 27.500 |
| Std | 0.069 | 0.250 |

From this analysis, we can see that the focus shifting from 0 to 1.5 DOF only causes +/−0.1 pixel drift, so the focus shift does not introduce significant error on the centroid estimation algorithm Tracking Pattern To leverage the existing technology, the tracking pattern can be a fiduciary mark which is an object used in the field of view of an imaging system that appears in the image produced, to be used as a point of reference or a measure. It may be either something placed into or on the imaging subject, or a mark or set of marks in the reticle of an optical instrument.

Here are some well-known applications making use of the fiduciary mark.

PCB

Figure 12D:
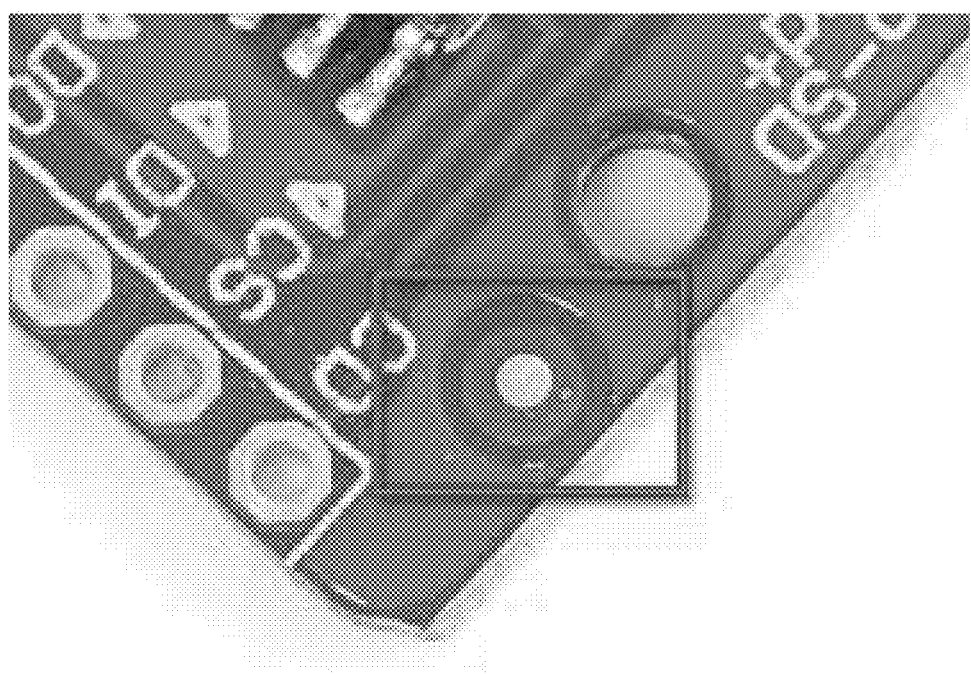
FIG. 12D illustrates a fiduciary mark on a PCB.

In printed circuit board (PCB) design, fiduciary marks, also known as circuit pattern recognition marks or simply "fids," allow automated assembly equipment to accurately locate and place parts on boards. FIG. 12D illustrates a fiduciary mark on a PCB.

Virtual Reality

Figure 12E:
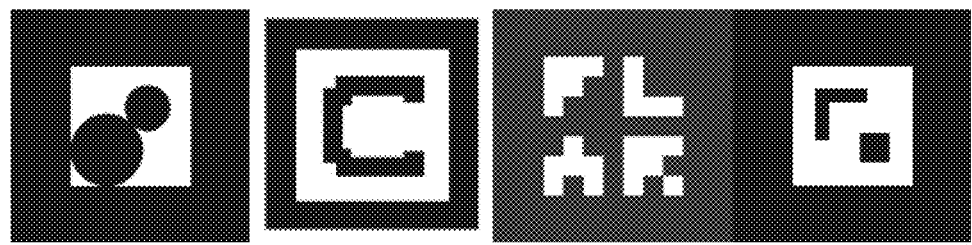
FIG. 12E illustrates examples of the AR (augmented reality) markers.

In applications of augmented reality or virtual reality, fiduciary markers are often manually applied to objects in a scene so that the objects can be recognized in images of the scene. For example, to track some object, a light-emitting diode can be applied to it. With knowledge of the color of the emitted light, the object can be easily identified in the picture. FIG. 12E illustrates examples of the AR (augmented reality) markers.

Software Tracking Algorithm

Figure 12F:
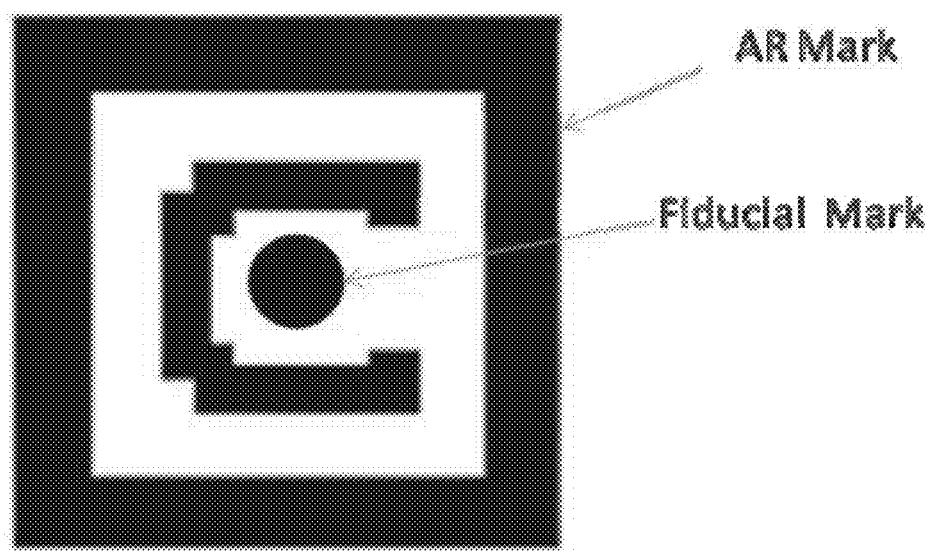
FIG. 12F illustrates a tracking pattern that combines an AR mark and a PCB fiduciary mark.

To leverage the existing technology, the tracking pattern can be combined by an AR mark and a PCB fiduciary mark, as illustrated by FIG. 12F. The AR mark provides the feature for the system to find the detector device(s) from the whole captured image in real time while the fiduciary mark provides the feature for the system to estimate the fine position of the detector(s) via the centroid estimation algorithm.

In short, AR mark gives a coarse estimation of the location of the detector device(s), while fiduciary marks give the fine estimation of the location of the detector device(s). In addition, motion detection is also a good way to find the detector device(s) during the system setup.

Figure 12G:
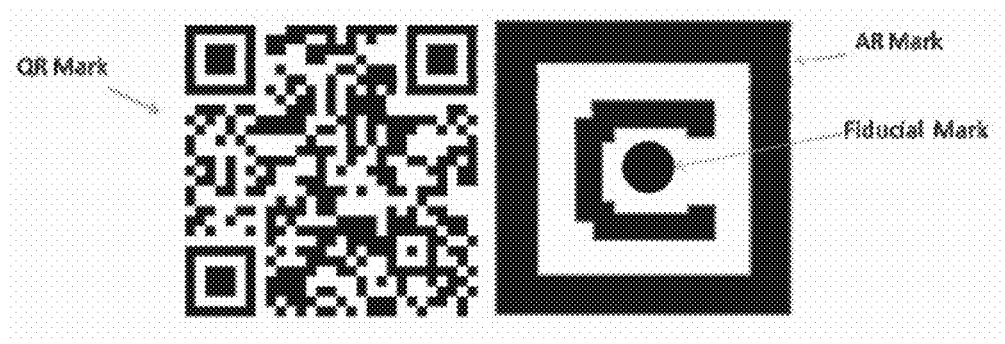
FIG. 12G illustrates a tracking pattern with an embedded code.

FIG. 12G illustrates a tracking pattern with an embedded code. More information can be delivered to the system via the tracking pattern by embedding the coded pattern such as bar code, QR code.

The tracking pattern does not need to be a passive pattern. It can also be an active pattern such as a LED or an array of LED. The fiduciary mark becomes the LED.

The AR mark and fiduciary mark become a group of pixels in the LCD display, or any other active devices that can display the tracking pattern, or a mix of passive and active pattern to form the tracking pattern.

Reproducing Object by Multiple Host Devices

Figure 12H:
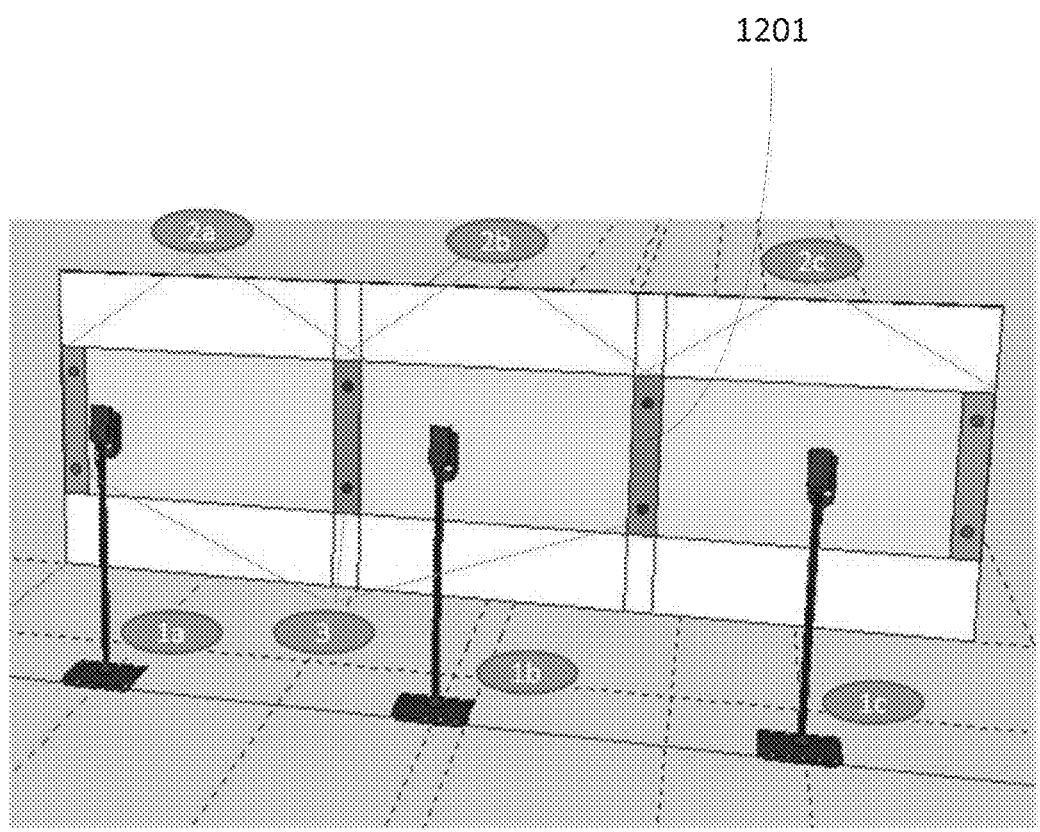
FIG. 12H illustrates a system for reproducing virtual objects according to another embodiment of the present patent application.

FIG. 12H illustrates a system for reproducing virtual objects according to another embodiment of the present patent application. The system is constructed with multiple host devices that extend the coverage of the target surface. Referring to FIG. 12H, 1a, 1b and 1c are the host devices. 2a, 2b and 2c are the FOVs of the host devices 1a, 1b, and 1c respectively. 3 are the calibration marks.

The area 1201 is the overlap area of two host devices' FOVs. The computer unit will combine the image captured by the multiple host devices, realign and resize the images using the calibration marks, which effectively enlarges the FOV of the system.

Reproducing Object on a 3D Surface

Figure 12I:
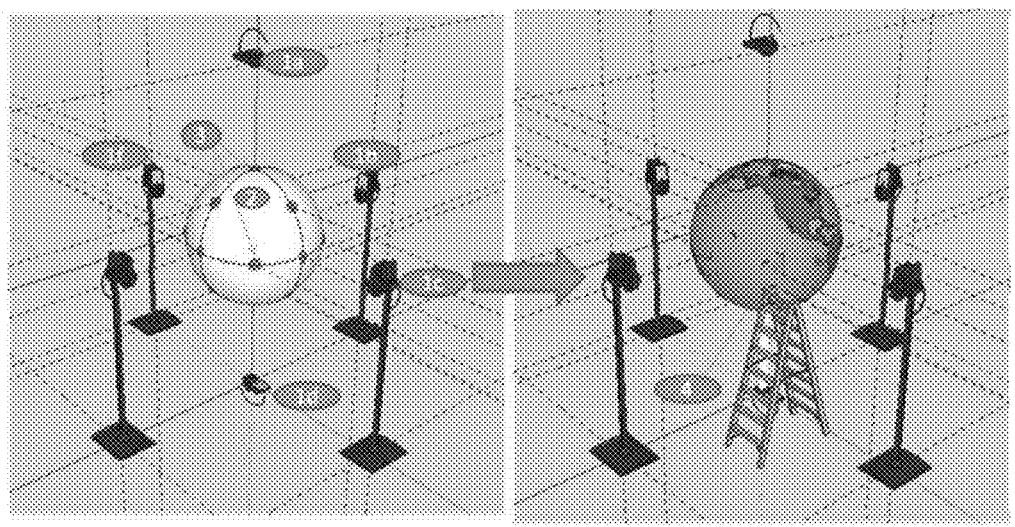
FIG. 12I illustrates a system for reproducing virtual objects according to another embodiment of the present patent application.

FIG. 12I illustrates a system for reproducing virtual objects according to another embodiment of the present patent application. Referring to FIG. 12I, the system is constructed with multiple host devices that can be used to reproduce an object on a 3D surface whose geometry is previously known. Referring to FIG. 12I, 1a, 1b, 1c, 1d, 1e, and 1f are the host devices. The number of the host devices required depends on the real application and can be any number greater than 1. 2 is a 3D surface (or sphere). 3 are the calibration marks. 4 is the user with the detector device.

The idea is to apply "3D perspective reproduction" techniques which map three-dimensional points to a two-dimensional plane as each host device represents a 2D plane. The 3D model of the known surface is first created in 3D CAD software based on the known geometry, and then the virtual cameras of the same quantity as the physical host devices are created in the virtual CAD environment. Each virtual camera is aligned in the way that the orientation and distance between the real camera and the real surface are the same as the virtual camera and the virtual surface by using known property of the calibration mark on the real surface as well as the sensor information in the host device such as distance, angular information between the host device and the target surface. After the calibration, the 3D target surface is mapped to multiple 2D planes and then we can use the same techniques as aforementioned to reproduce any object on the 3D surface.

The system for reproducing virtual objects illustrated in the above embodiments may be applied in areas that include:
1. Computer Assisted Drawing
2. Computer Navigated Drawing
3. Computer Assisted Layout
4. Computer Aided Assembly
5. Virtual Projector
6. Displacement Measurement Application: Computer Assisted Drawing Art projection has been used in fine art painting for a long time. The earliest form of the camera obscura pinhole viewing system, used to project and visualize images, dates back to the 1500s. It offers a very inexpensive way to transfer images to the work surface. It can be very effective as time and labor saving tools, given the fact that it eliminates the tasks of scaling, sizing and proportion interpretation by the artist. Rather than draw the image, someone can simply use a projector to capture it and immediately transfer it to the wall or canvas or wherever desired surface.

Figure 12J:
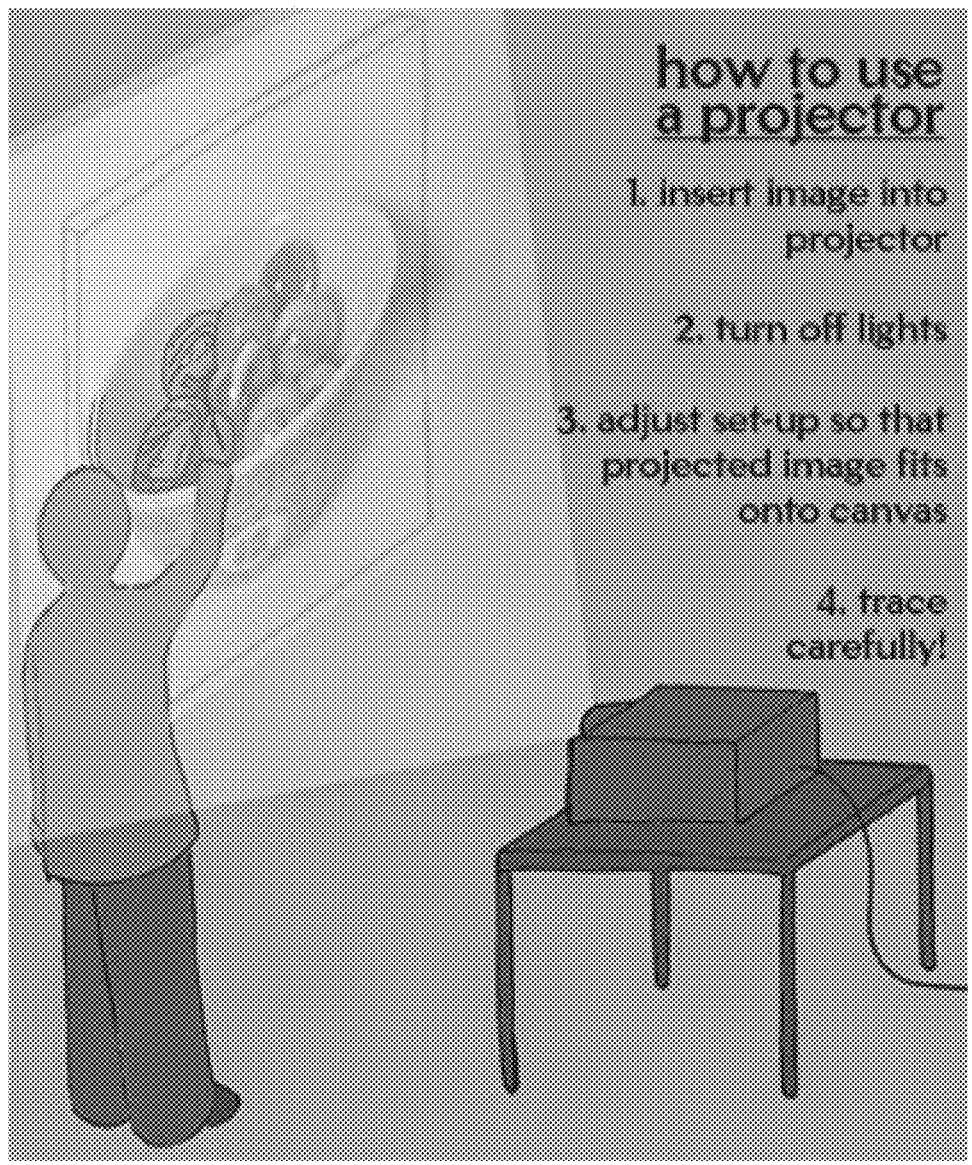
FIG. 12J illustrates how to use a projector.

The operation is very easy and straightforward. The selected picture is placed beneath the unit. It is illuminated by a bulb, and then reflected through the lens and projected onto the desired surface. FIG. 12J illustrates how to use a projector.

Figure 12K:
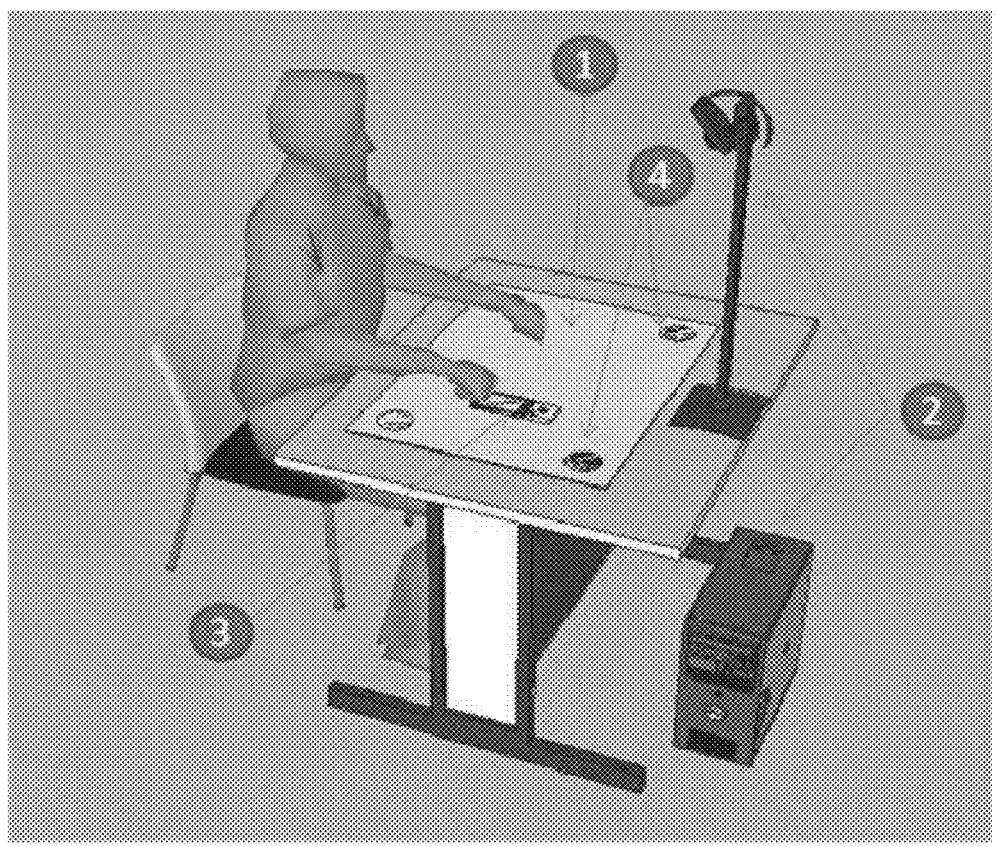
FIG. 12K illustrates a system for reproducing virtual objects according to an embodiment of the present patent application.
Figure 12L:
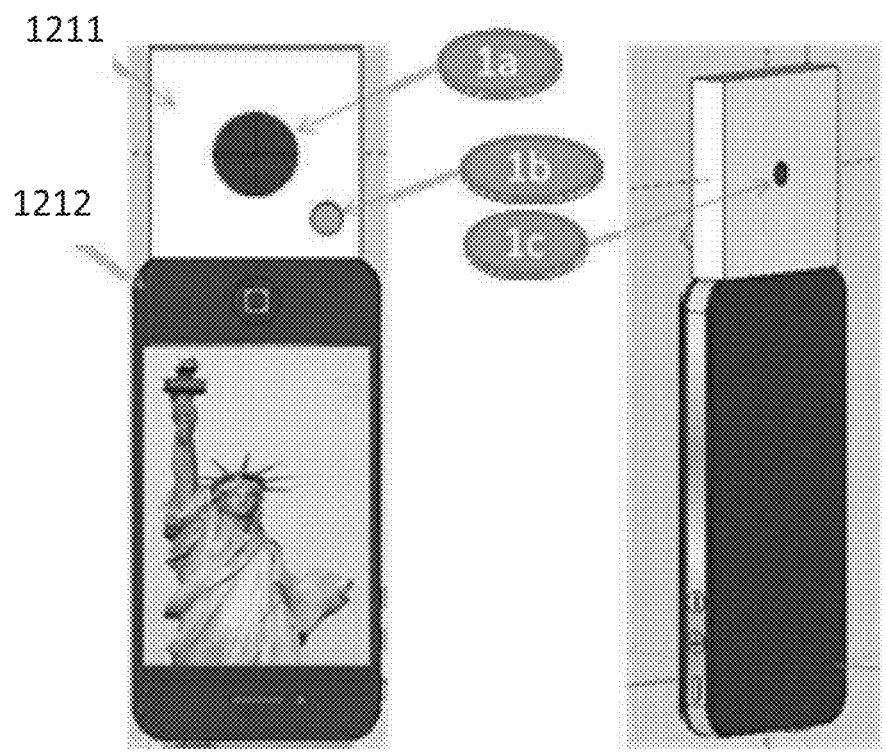
FIG. 12L illustrates a detector device in the system depicted in FIG. 12K.

There are many types of projectors in the market that can be used for art projectors, including:
a. Opaque Projector
b. Slide Projector
c. LCD Projector or DLP Projector
d. Overhead Projector FIG. 12K illustrates a system for reproducing virtual objects according to an embodiment of the present patent application. The system is a low cost and high precision system which can do the same job as the Art Projector. Referring to FIG. 12K, the system includes a surface (a canvas, drawing paper) 1, a host device 2, a detector device 3 and a calibration mark 4. FIG. 12L illustrates the detector device in the system depicted in FIG. 12K. Referring to FIG. 12L, the detector device includes a target 1211 and a smartphone 1212. The target 1211 includes a pattern 1a which allows the host computer to track its location, a button 1b which allows the user to mark on the surface, a pen 1c which is aligned to the center of the pattern 1a.

As shown in FIG. 12K, the calibration mark 4 includes a set of stationary tracking objects on the physical surface which defines the target surface used to reproduce the virtual object. Such a configuration may maintain the aspect ratio between the physical object and the virtual object and allow the system to automatically compensate the movement between the host camera and the target surface. The number of the stationary tracking objects is not limited. Two or more stationary tracking objects may be provided on the target surface. Also, the position of each stationary tracking object is not limited. Taking FIG. 12K as an example, two stationary tracking objects may be respectively provided on two corners of the target surface. Obviously, four stationary tracking objects may be respectively provided on four corners of the target surface to define a quadrilateral surface as shown in FIG. 12K. A tracking object carried by the detector device 3 may be movable on the target surface defined by the stationary tracking objects.

Figure 12M:
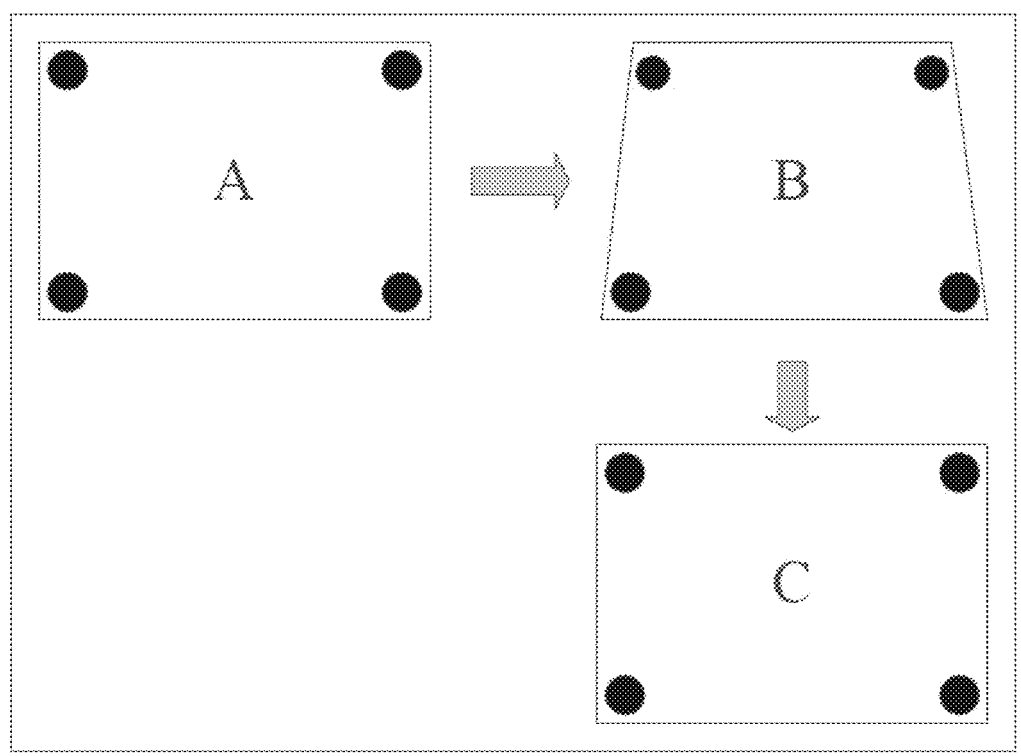
FIG. 12M illustrates the correction of angular errors in the system depicted in FIG. 12K.

The setup process of the system includes the following steps:
1. Connect the system depicted in FIG. 12K.
2. Launch the software in the PC.
3. Align the camera until the FOV covers all the calibration mark on the surface.
4. Correct the angular error (pitch, yaw and roll) using the calibration mark by software algorithm
   In this case, the main error is the pitch error since the camera is not in parallel to the surface. The rectangular surface will become a trapezoid surface, as illustrated in FIG. 12M. Referring to FIG. 12M, A is the rectangular surface, B is the trapezoid image captured by the camera, and C is the corrected rectangular image using the calibration mark.
5. Load the selected photo.
6. Overlay the selected photo on the captured image.
7. Scale and reposition the overlaid image to the user's desired form.
8. Convert the selected photo into various layers such as contour layers, color layers, and etc.

The steps for conducting computer assisted drawing/painting include:
1. Select the desired layer for drawing.
2. The selected layer will be overlaid on the live captured image.

3. Hold the detector device on the surface and navigate it along the overlaid image.
   For easy illustration, we can use a GPS map application on a smartphone as an example, wherein the map corresponds to the selected layer, the GPS location corresponds to the tracking pattern location, and the GPS dot on the map corresponds to tracking dot on the template.
4. The host computer will continuously track the tracking pattern and update the screen of the user's smartphone.
5. The user selects an area to start reproducing the selected image.
6. When the tracking dot touch any object on the selected image, the system will tell the user the object's properties such as line, circle, color and etc.
   a. If it is a line, the user presses the button 1b to mark the point. The user can mark several points and then join the lines by free hand.
   b. If it is a color property, user selects the color of marker/paint to fill in the area.
   c. If it is one of the other properties, user selects other tools to reproduce the object.
7. Repeat step 3 to 6 until all the objects on the selected layer have been reproduced on the surface.
8. Repeat step 1 to 7 until all the layer has been reproduced on the surface.

System Resolution

Assume we use:
a. 702p web cam with resolution of 1280×720 pixel
b. A0 drawing paper with size 1189×841 mm
The following table shows the system resolution:

| Digital Video Camera | Pixel Resolution | | Surface Dimension (mm) | | System Resolution (mm) with centroid estimation algorithm | |
|---|---|---|---|---|---|---|
| | Horizontal | Vertical | Horizontal | Vertical | Horizontal | Vertical |
| 1080p | 1920 | 1080 | 1189 | 841 | 0.06 | 0.08 |
| 720p | 1280 | 720 | 1189 | 841 | 0.09 | 0.12 |
| VGA | 640 | 480 | 1189 | 841 | 0.19 | 0.18 |
| 12MP | 4000 | 3000 | 1189 | 841 | 0.03 | 0.03 |

Computer Assisted Drawing/Painting: Wall Art Painting

Beautiful art paintings, created directly on walls can become a delightful and original decoration in a business place as well as in a private home, on building elevations and indoors. Usually, this job can only be accomplished by professionals who charge a considerable amount of money for doing this job. Interior walls usually have a size of 6 m². Exterior walls usually have a size of 15 m² or larger.

The whole concept of wall art painting is to break down the whole giant artwork into small puzzles. Each puzzle has a contour line and then filled with the appropriate color. The trickiest part of wall art painting is to outline the contour of the artwork on the wall with the exact scale. Once the contour is done on the wall, everyone can complete the color filling part by themselves.

Figure 13:
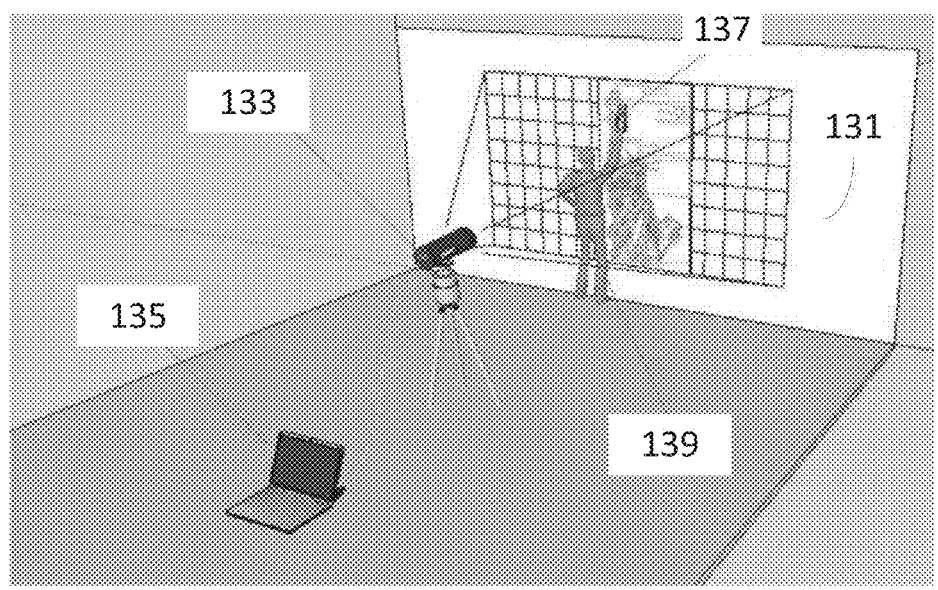
FIG. 13 illustrates a system for reproducing virtual objects applied to wall art painting according to an embodiment of the present patent application.
Figure 14:
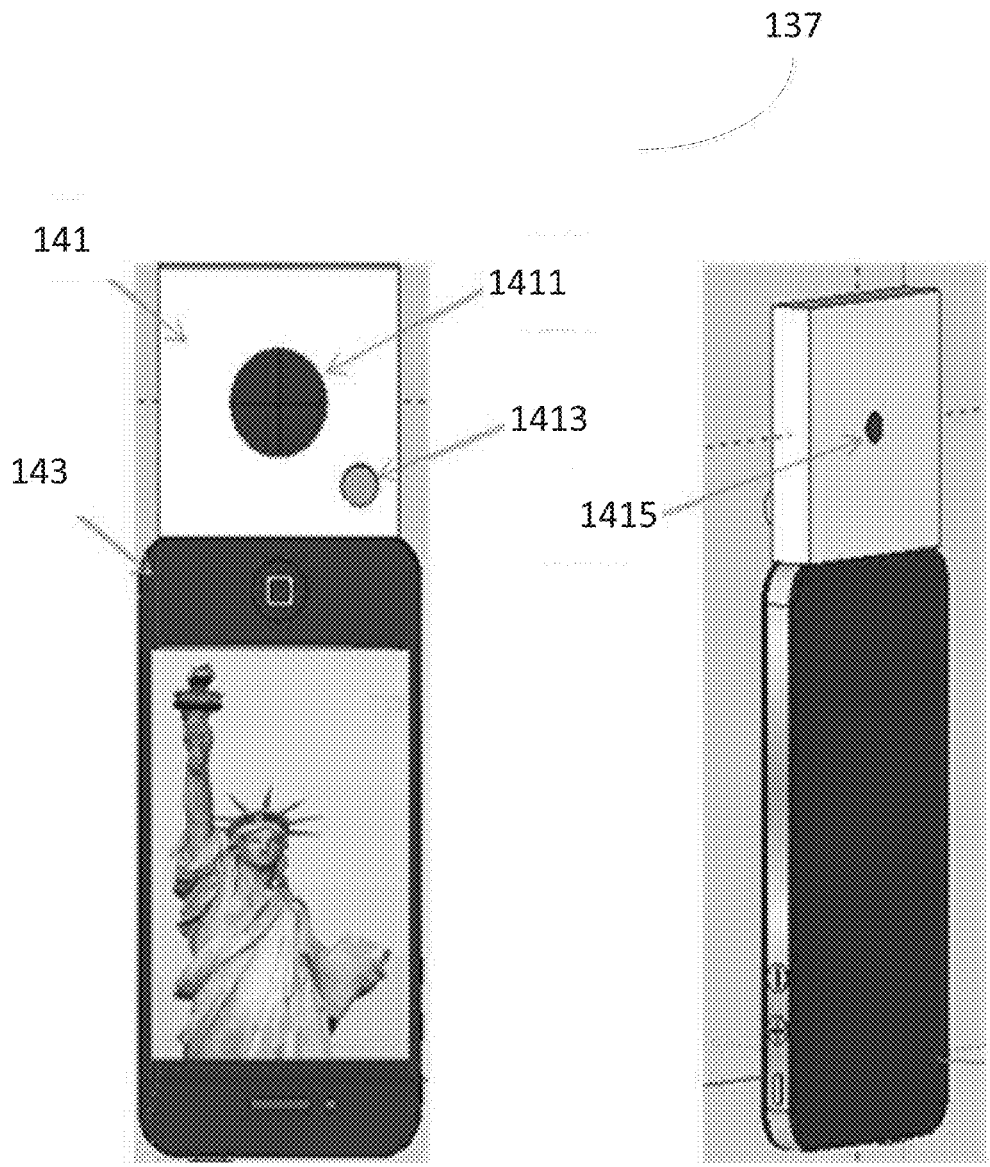
FIG. 14 illustrates the detector device of the system depicted in FIG. 13.

FIG. 13 illustrates a system for reproducing virtual objects applied to wall art painting according to an embodiment of the present patent application. Referring to FIG. 13, the system includes a wall 131, a host device that includes a host camera 133 and a host computer 135 connected with the host camera 133, and a detector device 137. The system is operated by a user 139. FIG. 14 illustrates the detector device 137 of the system depicted in FIG. 13. Referring to FIG. 14, the detector device 137 includes a target 141 and a smart phone 143. The target 141 includes a pattern 1411 which allows the host computer 135 to track its location, a button 1413 which allows the user to mark on the wall, and a pen 141 which is aligned to the center of the pattern 1411. The smart phone 143 is configured to display the image and information from the host device.

Figure 15:
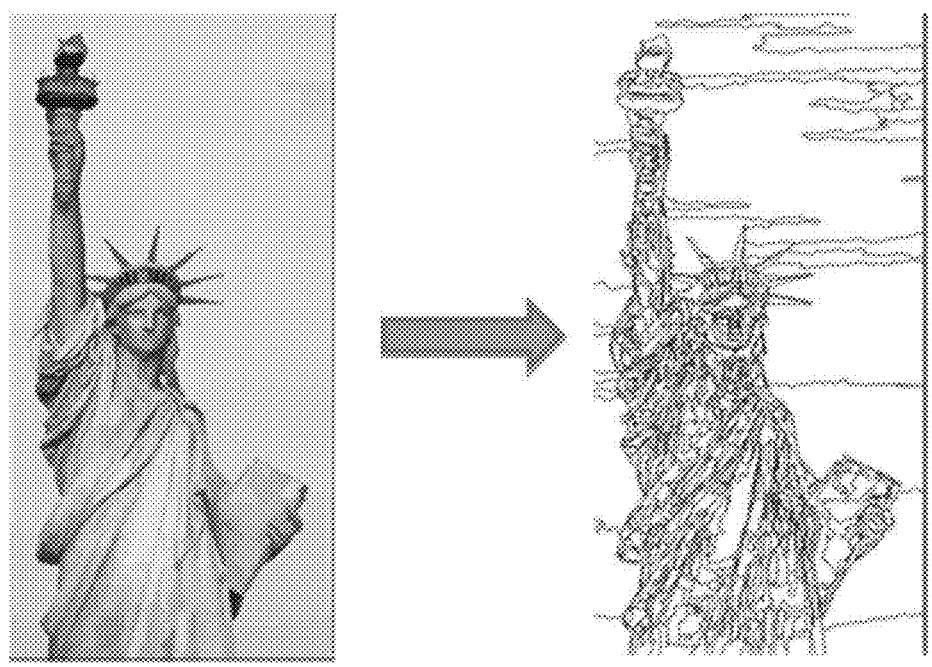
FIG. 15 illustrates the generation of the template by the system depicted in FIG. 13.

The setup of the system depicted in FIG. 13 includes the following steps:
1. Setup the host camera 133 so that the camera can capture the area where the wall is going to be painted;
2. Select a photo that the user wants to paint on the wall (for example a picture of The Statue of Freedom);
3. Launch the software and load the photo in the host computer 135;
4. The software overlaps the photo with the live image captured from the host camera 133;
5. Use the software to scale, rotate and reposition the photo until the photo is adjusted to a desired form on the wall;
6. Freeze the photo and generate the template (FIG. 15 illustrates the generation of the template);
7. The software enters the tracking mode or painting assistance mode.

The process of reproducing the template on the wall includes the following steps:
1. The user goes to the wall with the detector device 137;
For easy illustration, we can use a GPS map application on the smart phone as an example:
The Map=Template
GPS location=Tracking pattern location
GPS dot on the map=Tracking dot on the template
2. The host computer 135 continuously tracks the tracking pattern and updates screen of the user's smartphone 143;
3. User selects an area to start reproducing the template;
4. When the tracking dot touches any line on the template, the user presses the button 1413 to mark the point;
6. The user can mark several points and then join the line by free hand;
7. Repeat the steps 3 to 6 until all the line on the template is reproduced on the wall.

The process of reproducing the color in the template on the wall includes the following steps:
1. The user goes to the wall with the detector device and the paints are marked with numbers;
2. The user uses the detector device 137 to locate the puzzle that he wants to paint;
3. The host computer 135 updates the color information of that particular area to the screen of the smart phone 143;
4. The user selects the appropriate color and then fills the area with the color;
5. Repeat the steps 2 to 4 until all the areas are filled with appropriate colors.

Figure 16:
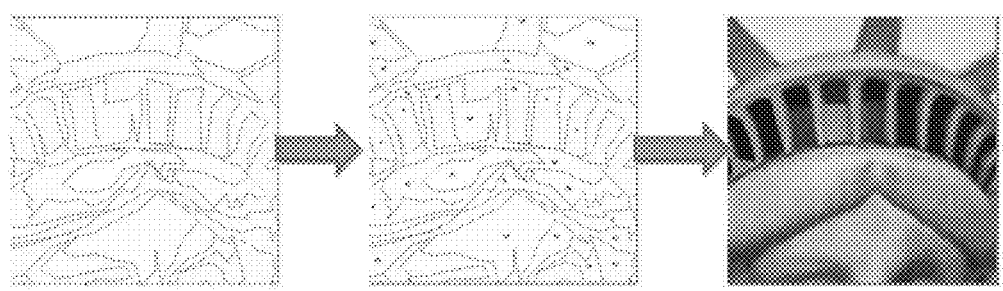
FIG. 16 illustrates a process of reproducing the color in the template generated by the system depicted in FIG. 13.

FIG. 16 illustrates the above process.

Figure 17A:
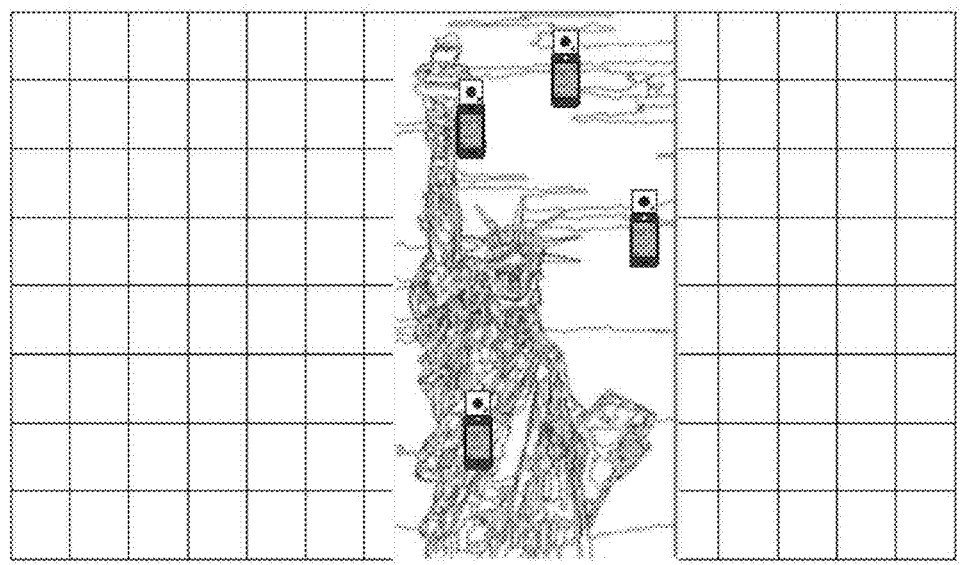
FIG. 17A illustrates the system of FIG. 13 being extended to multi user mode by including multiple detector devices.

The above-mentioned system can be extended to multi user mode by including multiple detector devices as long as the detector devices can be seen by the host device. As illustrated in FIG. 17A, the detector devices can carry different IDs, which allow the host device to identify each individual detector devices or users. In another embodiment, the host device is configured to identify different detector devices based on the location of the particular detector device.

Application: Computer Navigated Drawing/Painting

Figure 17B:
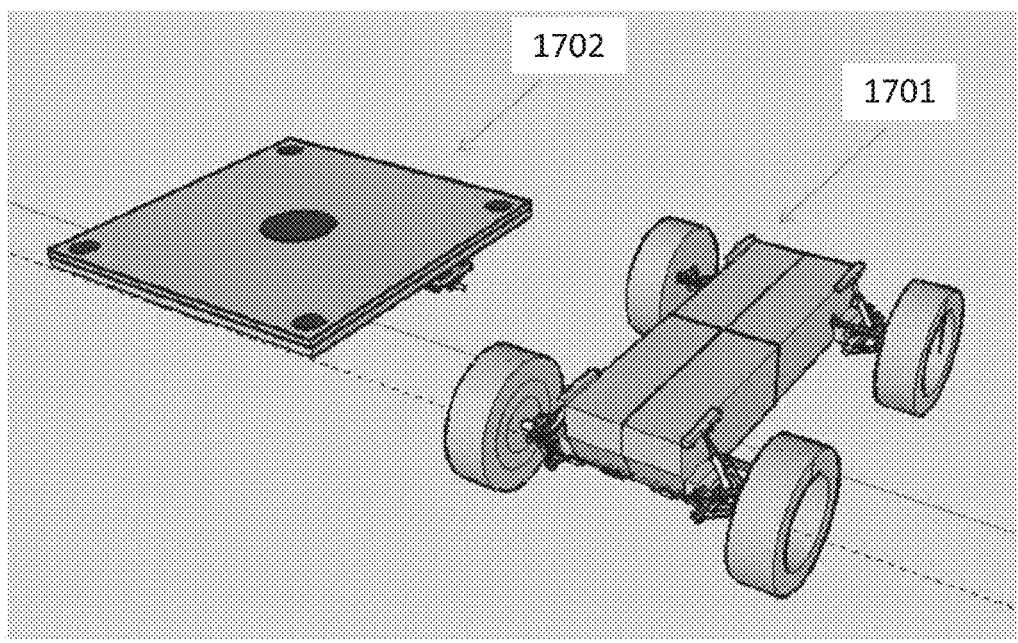
FIG. 17B illustrates a detector carrier according to another embodiment of the present patent application.
Figure 17C:
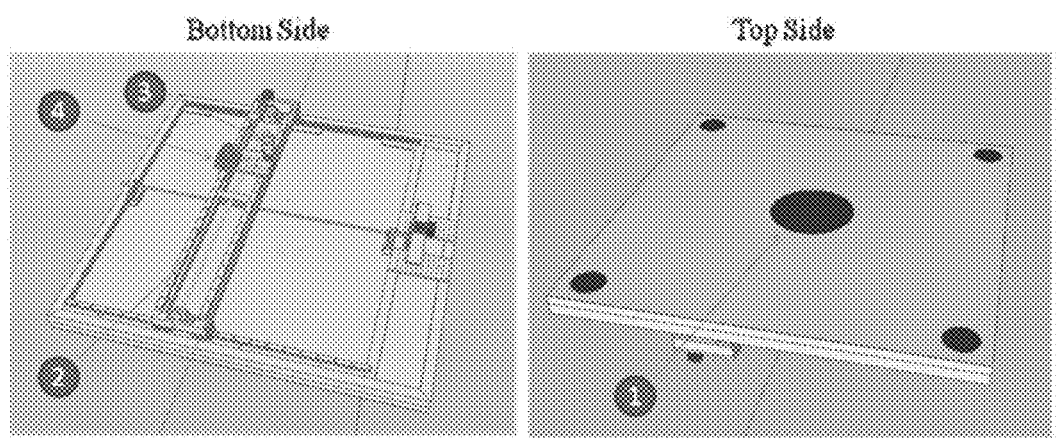
FIG. 17C illustrates the top and bottom sides of the detector device in the detector carrier depicted in FIG. 17B.

Computer navigated drawing is an extension to the computer assisted drawing. All the setups in computer navigated drawing are the same as computer assisted drawing except that the detector device is now carried by a computer navigated machine (detector carrier) instead of the user. The host computer will take full control to navigate the detector carrier. FIG. 17B illustrates a detector carrier according to another embodiment of the present patent application. Referring to FIG. 17B, the detector carrier includes a computer navigated machine 1701 and a detector device 1702. The detector device 1702 includes two sides, as illustrated in FIG. 17C. Referring to FIG. 17C, the top side faces to the host device and includes the Tracking pattern 1. The bottom side includes a computer controlled XY table 2, which provides a fine adjustment of the printer head with respect to the tracking pattern, a printer head 4 mounted on the XY table, which prints the virtual object on the surface, and a camera 3 mounted on the XY table, which provides a more precise way to control the printer head 4 by optical pattern recognition techniques.

Figure 17D:
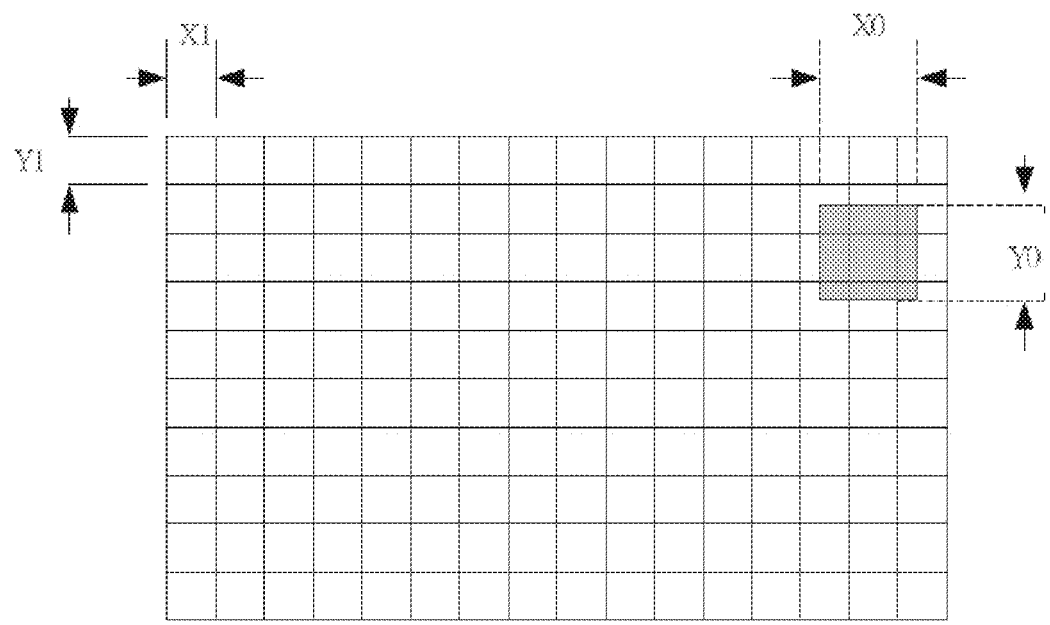
FIG. 17D illustrates the operation of the system depicted in FIG. 17B.

The operation of the system is described as follows and illustrated by FIG. 17D.
1. The computer navigated machine is navigated by the host computer with the min. step resolution on X and Y axes being X1 and Y1.
2. The XY table is controlled by the host computer with the range on X and Y axes being X0 and Y0. The min. step resolution on X and Y axis is equal to or better than the resolution of the tracking object detected by the host device.

So the printer head is controlled by following elements.
1. The computer navigated machine provides the coarse movement of the printer head.
2. The XY table provides the fine movement of the printer head.
3. The camera provides the close loop feedback which corrects any error introduced by the system via the optical pattern recognition techniques.

As long as X0>X1 and Y0>Y1, then the host computer can navigate the printer head to any arbitrary location with the resolution of the tracking object.

Figure 17E:
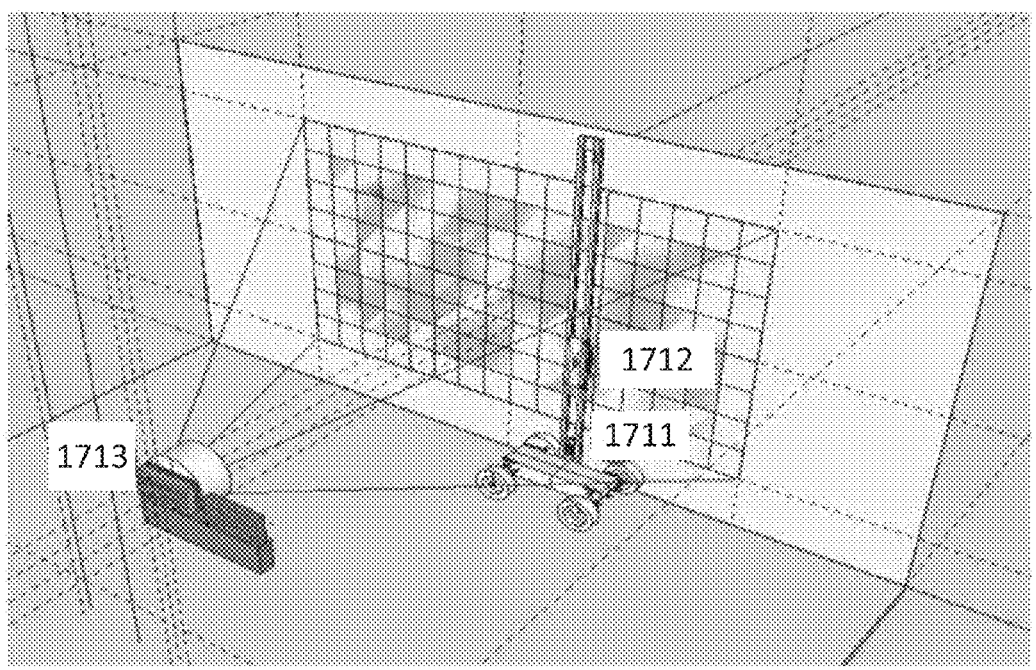
FIG. 17E illustrates a typical implementation of computer navigated drawing with the system depicted in FIG. 17B.
Figure 17F:
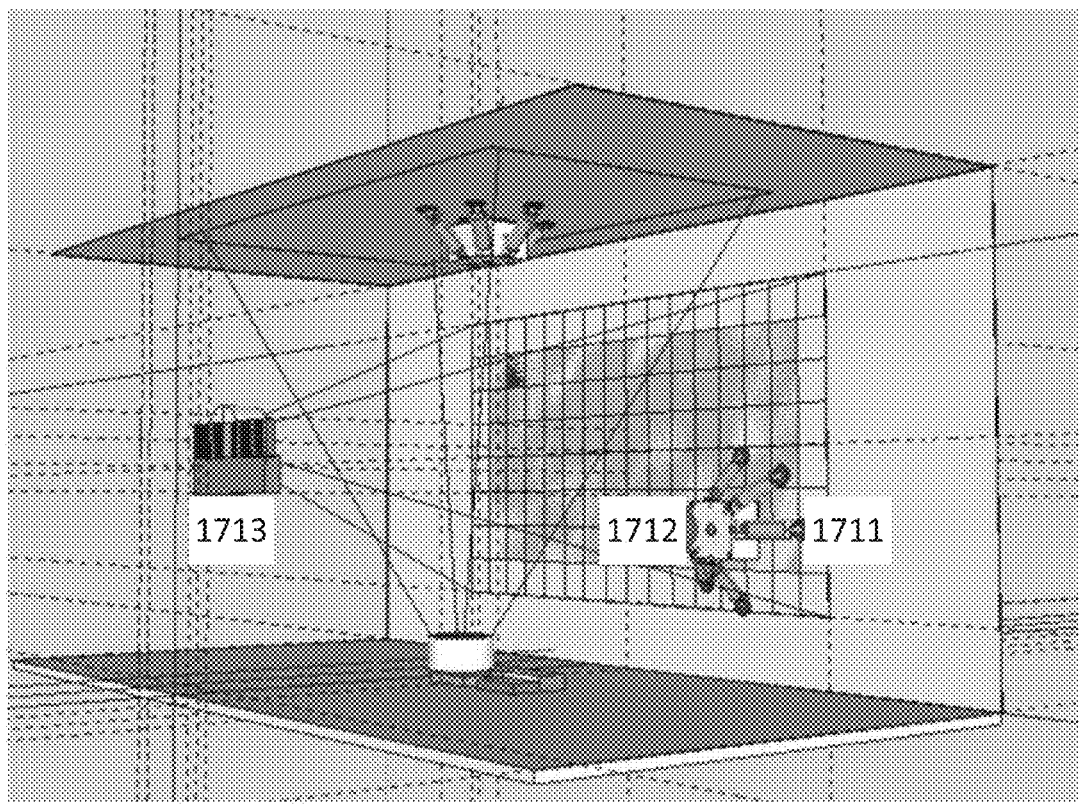
FIG. 17F illustrates another typical implementation of computer navigated drawing with the system depicted in FIG. 17B.

There are two typical implementations of the computer navigated drawing with the above-mentioned system. FIG. 17E and FIG. 17F illustrates the two typical implementations. Referring to FIG. 17E and FIG. 17F, 1711 is the computer navigated machine, 1702 is the detector device, and 1703 is the host device. With the aid of the computer navigated machine, computer navigated drawing can be achieved on any surface including vertical wall, ceiling, exterior wall of any building and etc.

Application: Computer Assisted Layout

Figure 17G:
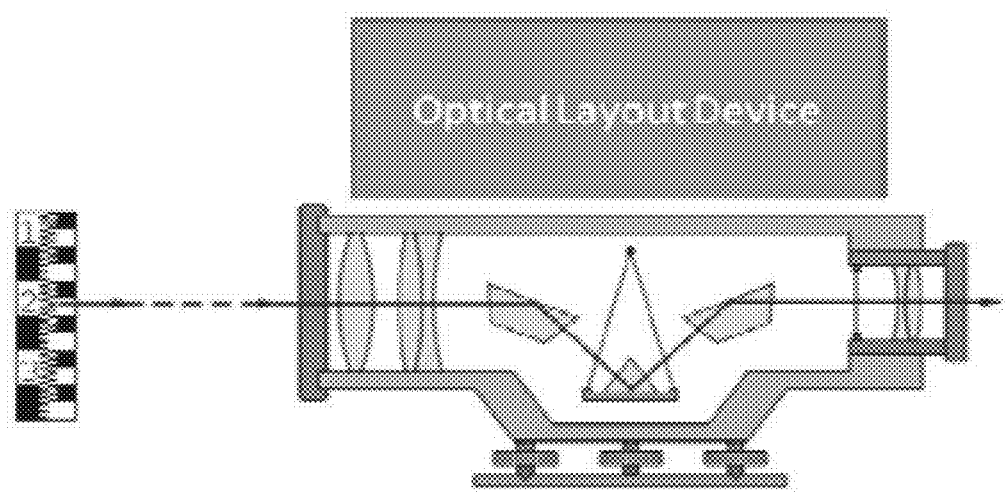
FIG. 17G illustrates an optical level.
Figure 17H:
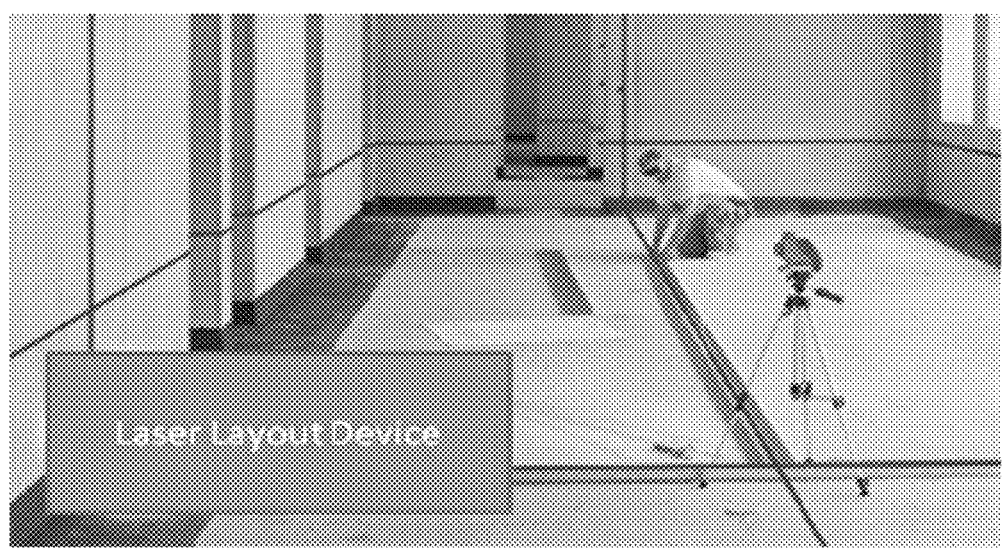
FIG. 17H illustrates a laser layout device.

There are two main categories of equipment that are commonly used in the industrial layout applications.
1. Optical level which is an optical instrument used to establish or check points in the same horizontal plane. It is used in surveying and building to transfer, measure, or set horizontal levels. FIG. 17G illustrates an optical layout device.
2. Laser level which project a point, line, or rotational laser on a work surface that allows engineers or contractors to lay out a building or site design more quickly and accurately than ever before, with less labor. In some industries, such as airline and shipbuilding, lasers provide real-time feedback comparing the layout to the actual CAE/CAD files. FIG. 17H illustrates a laser layout device.

The system for reproducing virtual objects in the above embodiments can be applied on industrial layout application which can do the same as the optical level and laser level.

Figure 17I:
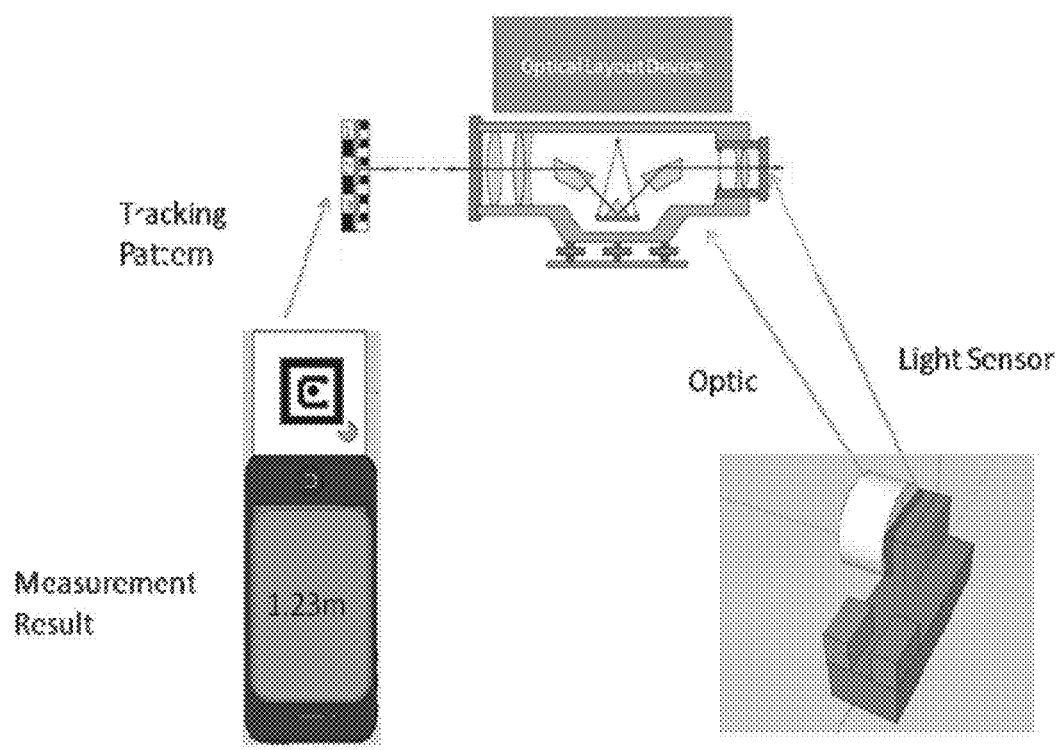
FIG. 17I illustrates a comparison between a system according to another embodiment of the present patent application and an optical level (optical layout device).

For the optical level, the optical base is functionally equivalent to the host device. The marker is functionally equivalent to the detector device. FIG. 17I illustrates a comparison between a system according to another embodiment of the present patent application and an optical level (optical layout device).

Figure 17J:
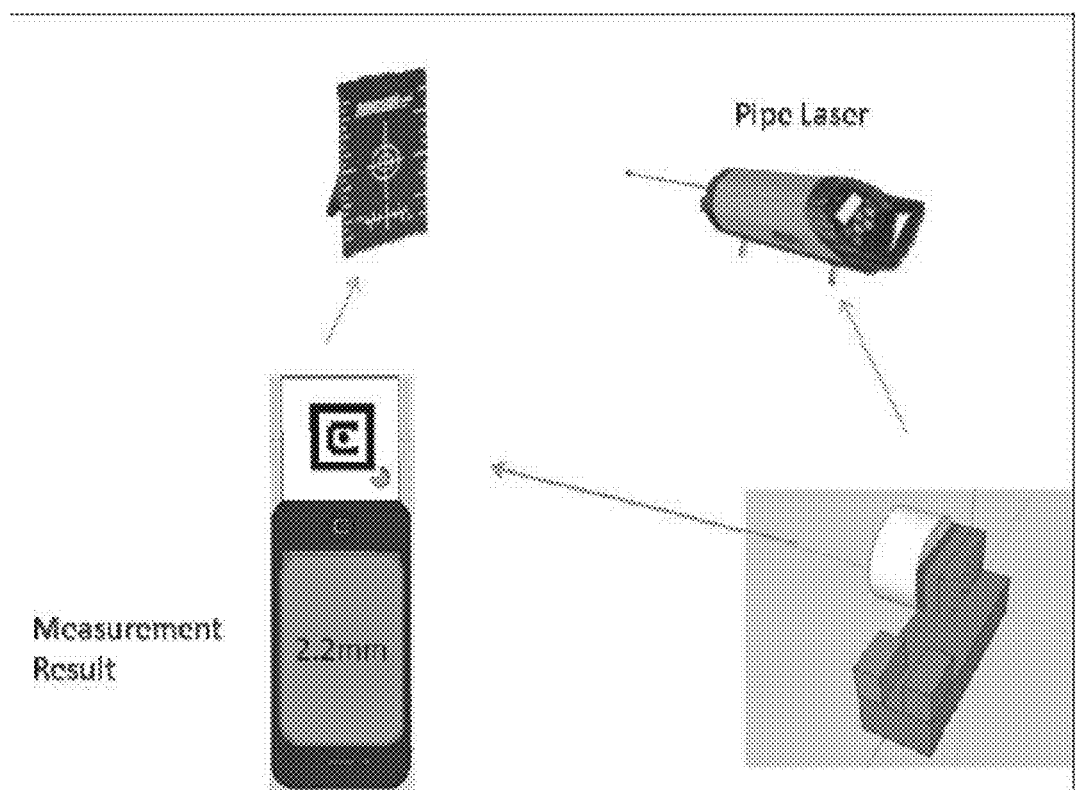
FIG. 17J illustrates a comparison between a system according to another embodiment of the present patent application and a laser level.
Figure 17K:
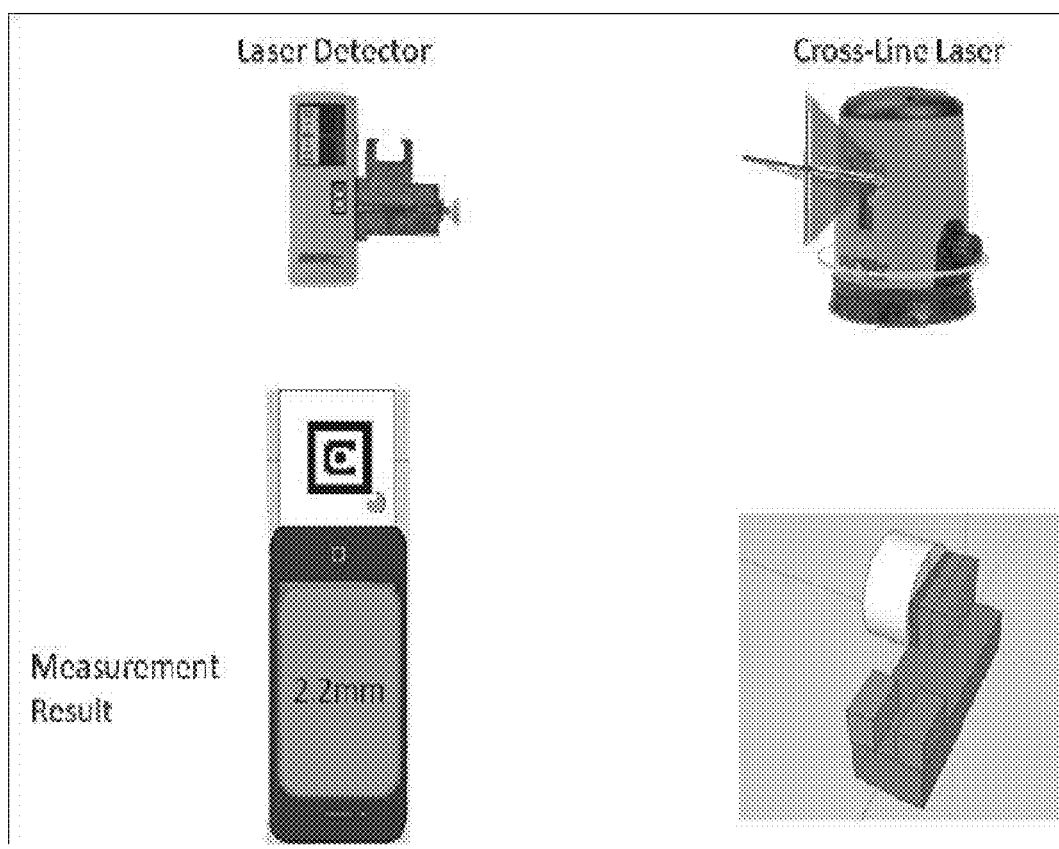
FIG. 17K illustrates a comparison between a system according to another embodiment of the present patent application and another laser level.
Figure 17L:
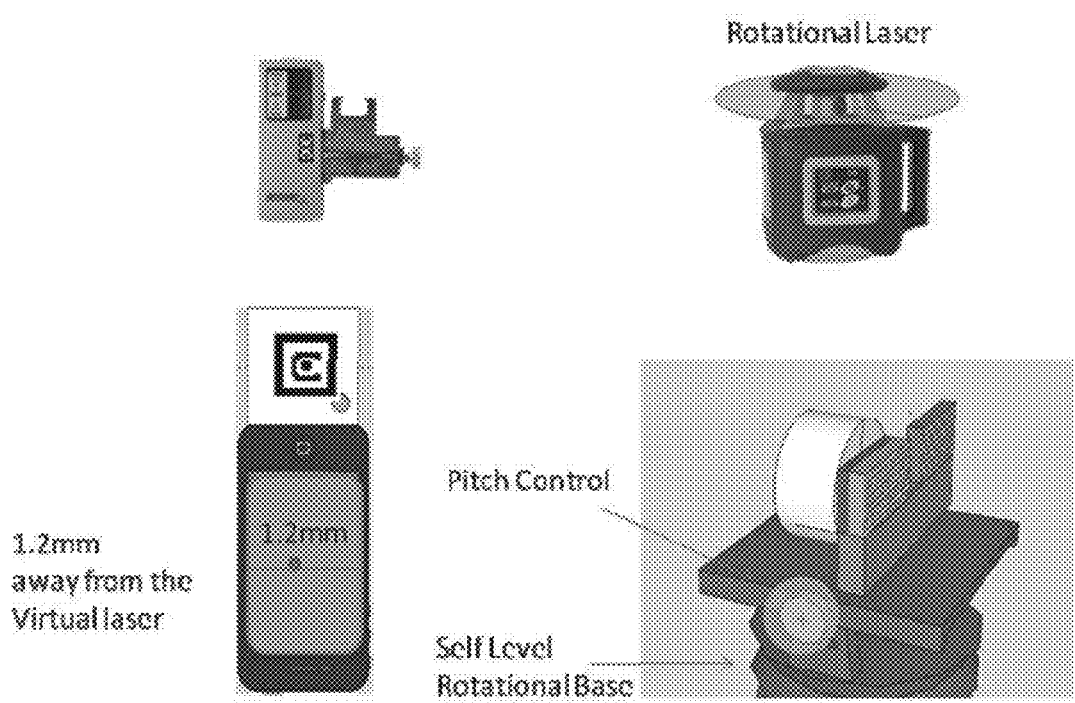
FIG. 17L illustrates a comparison between a system according to another embodiment of the present patent application and yet another laser level.

For the laser level, the laser base is functionally equivalent to the host device, and the laser detector is functionally equivalent to the detector device. FIGS. 17J-17L illustrate a comparison between a system according to another embodiment of the present patent application and a laser level of different types.

The system for reproducing virtual objects in the above embodiment is capable of conducting much more complex work than the conventional laser layout devices.

Application: Computer Assisted Layout—Photo Wall Layout

Figure 18:
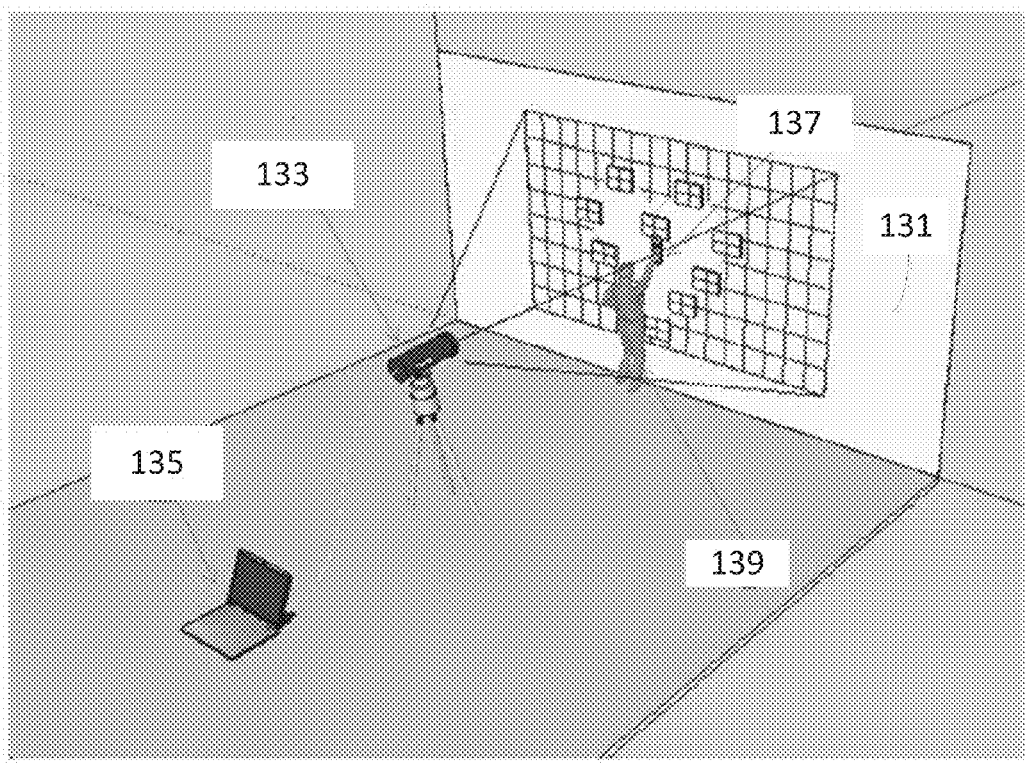
FIG. 18 illustrates a system for reproducing virtual objects according to an embodiment of the present patent application being applied to photo wall layout.

The system for reproducing virtual objects in the above embodiment can be applied to Photo Wall Layout. As illustrated in FIG. 18, in this case, it is the photo frame installed on the wall need to be leveled and in an exact scale and location as planned. The system needs to be calibrated as aforementioned. After the calibration, the objects (virtual photo frames forming a "heart" shape) are reproduced perfectly on the wall at the exact orientations and scale which form a virtual "heart" shape. Then the user can follow the reproduced virtual image to install the photo frames on the wall.

Figure 19:
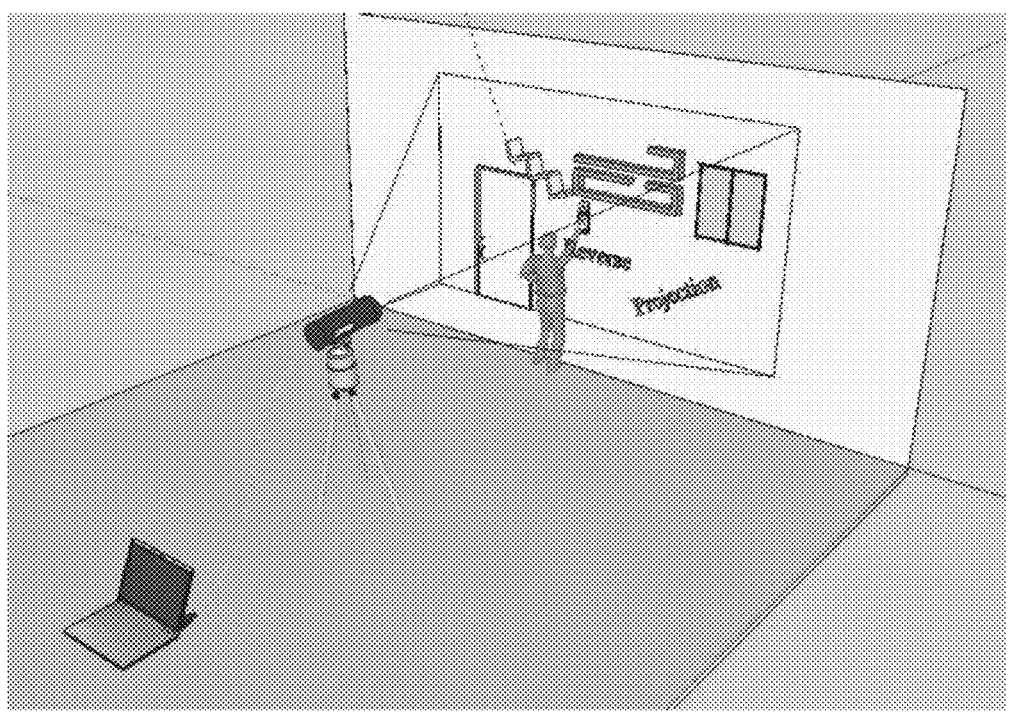
FIG. 19 illustrates a system for reproducing virtual objects according to an embodiment of the present patent application being applied to single wall interior layout.

The system for reproducing virtual objects in the above embodiment can be applied to Single Wall Interior Layout. As illustrated by FIG. 19, instead of installing photo frames, doors, wall shelves, windows, acrylic letter banners and etc. are installed. The system can be used to install any kind of object perfectly at the position that the user wants.

Figure 20:
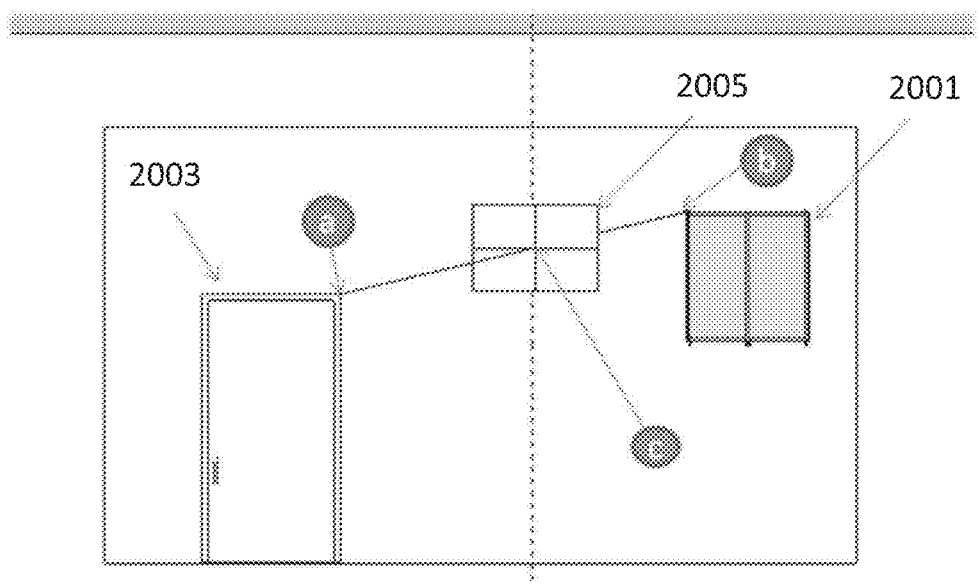
FIG. 20 illustrates a system for reproducing virtual objects according to an embodiment of the present patent application being applied to on-the-fly interactive layout.

The applications described above are based on the assumption that the layout pattern is predefined (or predesigned) in a computer and then reproduced to the wall. The system can also do on-the-fly interactive layout. FIG. 20 illustrates such an example. Referring to FIG. 20, there are a window 2001 and a door 2003 already existing on a wall. The task is to install a photo frame 2005 right at the middle of the upper right corner of the door 2003 and the upper left corner of the window 2001. The operation to accomplish the task with the system for reproducing virtual objects depicted in FIG. 20 is the following:
1. Move the detector device to the upper right corner of the door 2003;
2. Send a command to the host device to mark the point a;
3. Move the detector device to the upper left corner of the window 2001;
4. Send a command to the host device to mark the point b;
5. Send a command to the host device to create a line that joins the point a and point b;
6. Send a command to the host device to create a vertical line that passes the mid-point c of the line a-b;
7. Use the detector device to find the two lines;
8. The interception point c of the two lines is where the photo frame should be installed.

Figure 21:
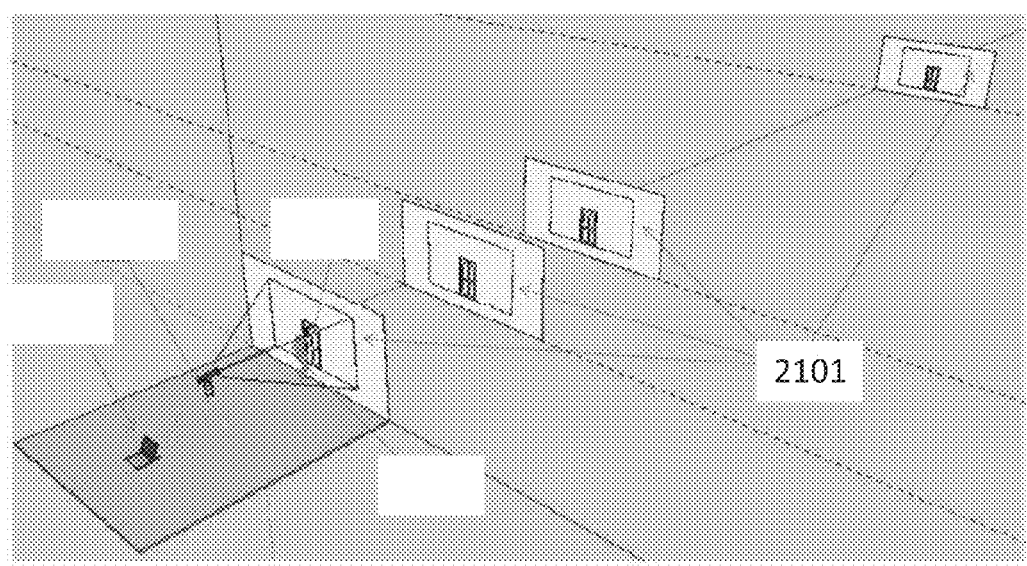
FIG. 21 illustrates a system for reproducing virtual objects according to an embodiment of the present patent application being applied to multi-wall layout.

The system for reproducing virtual objects in the above embodiment can also be applied to Multi-wall Layout, as illustrated in FIG. 21. This time the optical system is not a fixed focal length system. An adjustable focal length system (i.e. zoom lens) is used. The operation is the following:
1. The user starts to layout at the farthest wall;
2. Change the local length of the zoom lens until the camera captures the image of the whole wall;
3. Calibrate the system;
4. Do the Layout/Install the door on the wall.

5. Repeat the step 2 to 4 for the next wall until all the walls 2101 have been laid out.

As a result, all the doors are perfectly aligned with optical axis of the system.

If the optical axis of the system is calibrated to the leveled surface, then all the doors is aligned perfectly in a straight line with the leveled surface. If the optical axis of the system is calibrated to an offset angle with respect to the leveled surface, then all the doors are aligned perfectly in straight line with the same offset angle to the leveled surface. The system can go as far as the optics can go.

Figure 22:
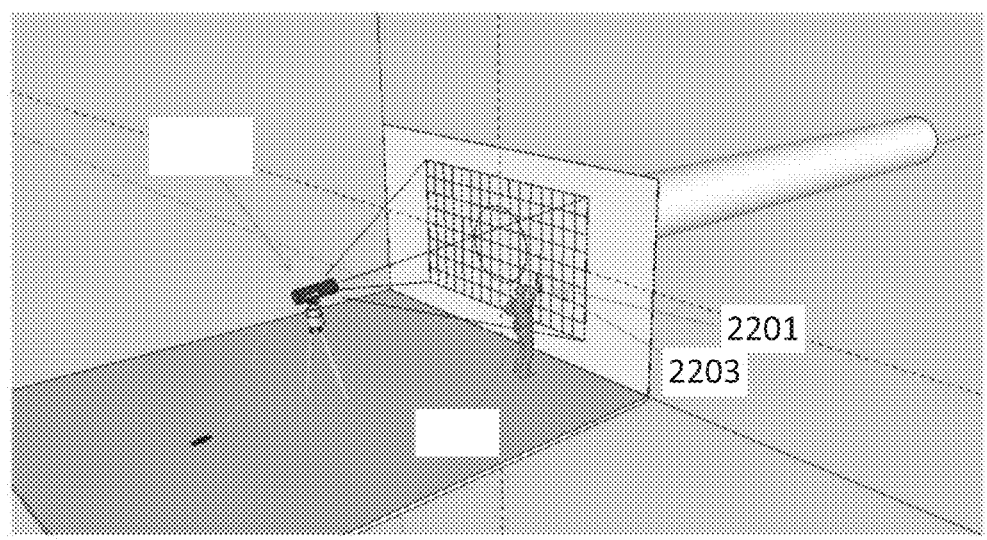
FIG. 22 illustrates a system for reproducing virtual objects according to an embodiment of the present patent application being applied to pipe layout.
Figure 23A:
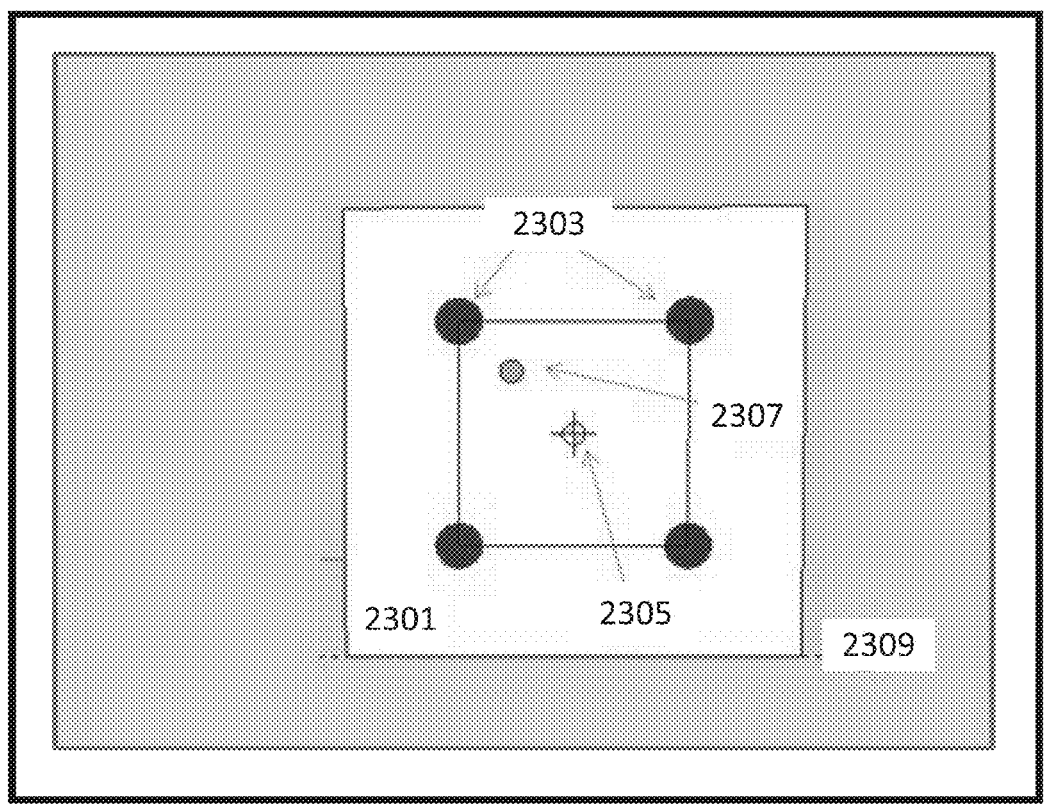
FIG. 23A illustrates the surface and the detector device being combined into a single device in the system depicted in FIG. 22.

The system for reproducing virtual objects in the above embodiment can also be applied to pipe layout as illustrated in FIG. 22. Laser is a very common tool in the industry to do the pipe layout. The laser is an intense light beam that can be concentrated into a narrow ray, containing only one color (red for example) or wavelength of light. The resulting beam can be projected for short or long distances and is clearly visible as an illuminated spot on a target. If the user aligns the center of the pipe to the center of the laser dot, then all the pipes will be perfectly aligned. To use the system for reproducing virtual objects, as there is no fixed surface to project the virtual object on, the surface 2201 and the detector device 2203 need to be fixedly attached with each other and combined into a single device illustrated in FIG. 23A. Referring to FIG. 23A, the device includes a LCD display 2301, four red dots 2303 as the tracking pattern for the host device to track its dimension and orientation, a virtual center calculated from the four red dots 2305, an optical center of the system or the center of the captured matrix 2307, and the FOV 2309 of the optical system.

If the detector device is moved, the host device will know the position of the virtual center 2305 and how much the virtual center 2305 is offset from the optical center 2307. Then the host device updates the position of the optical center 2307 on the LCD 2301. Now the goal is to move the detect device until the virtual center 2305 matches the optical center 2307. The user does it on every section of the pipe, which can make the pipes all aligned with a common reference axis.

It is understood that in an alternative embodiment, it may be not necessary to combine the surface 2201 and the detector device 2203 into a single device.

Figure 23B:
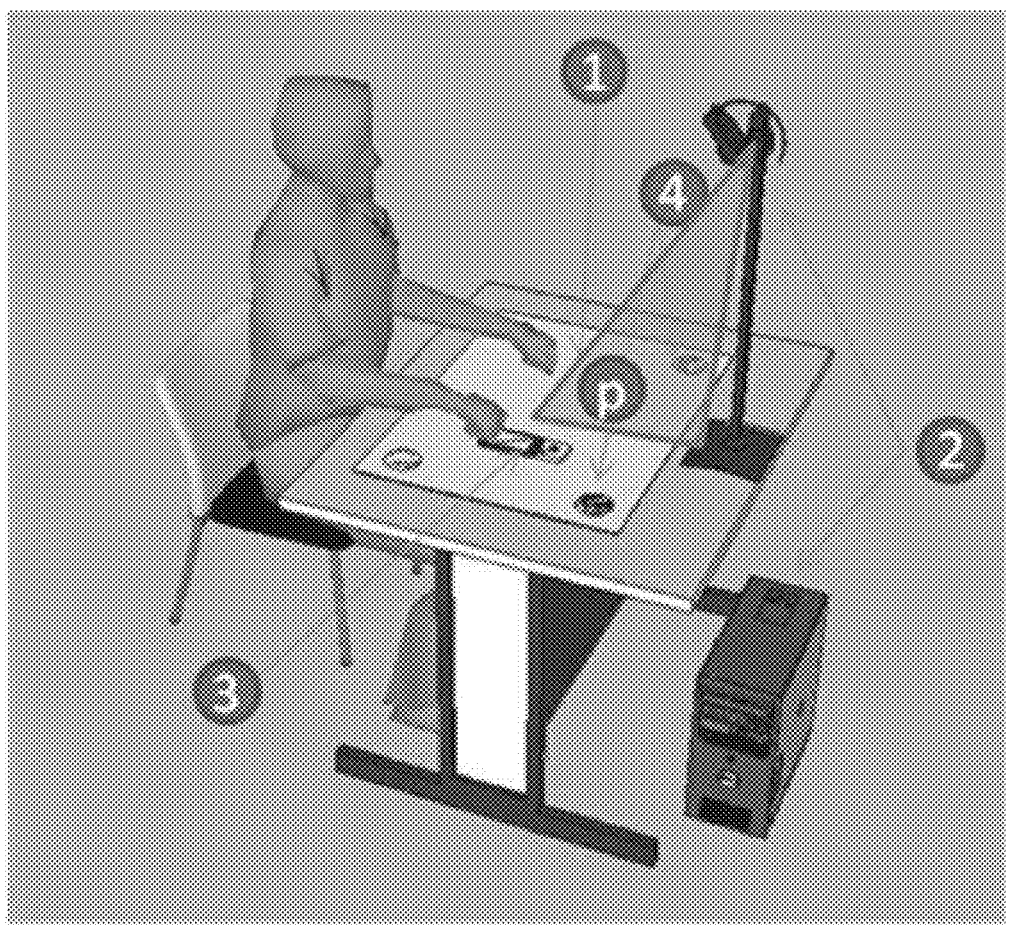
FIG. 23B illustrates a system according to another embodiment of the present patent application being applied in computer assisted drawing.
Figure 23C:
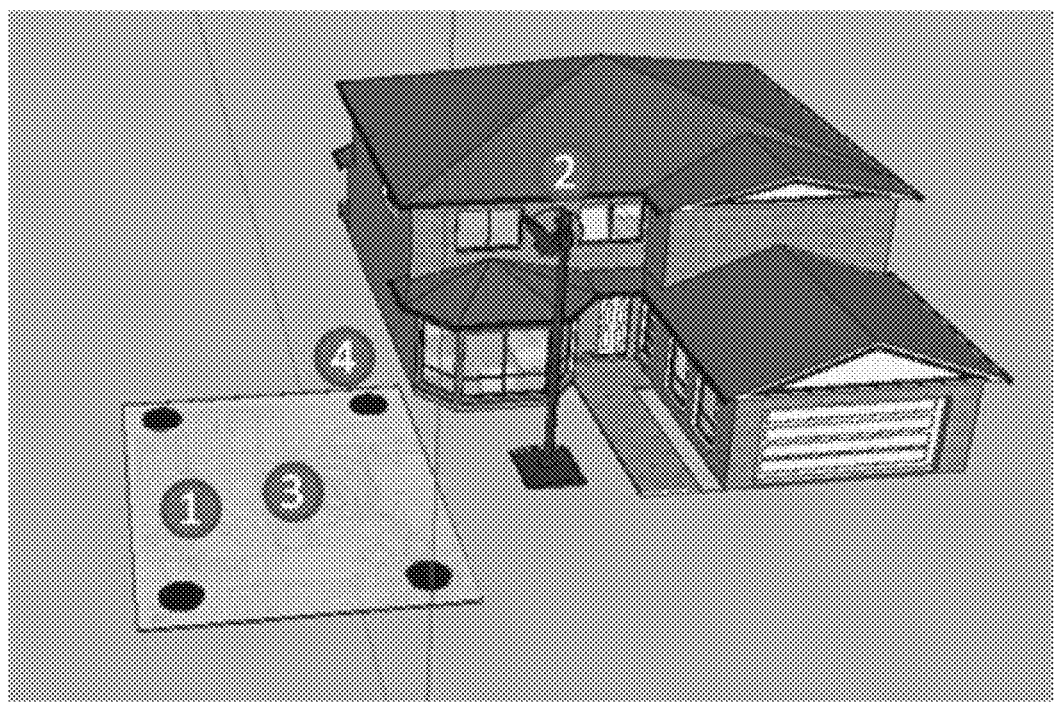
FIG. 23C illustrates a system according to another embodiment of the present patent application being applied in building foundation layout.

The system for reproducing virtual objects in the above embodiments can be applied to building foundation layout. The details of layout and planning are essential to proper construction of a building. Layout prepares the site for the foundation which must be planned and completed for each building being constructed. Modern foundation layout is usually done in CAD environment first and then the worker follows the dimension of 2D layout drawing and puts the marker on the ground to indicate all the features (eg. wall, pipe and etc.) defined on the 2D layout drawing. Now the 2D foundation layout drawing can be reproduced on the ground using this system. The whole process is similar to the application described as "Computer Assisted Drawing". As illustrated in FIG. The drawing paper is functionally equivalent to the job site and the drawing pattern is functionally equivalent to the 2D layout drawing. FIG. 23B and FIG. 23C illustrates the comparison.

Application: Computed Aided Assembly

In the process of large scale object assembly such as aircraft assembly and ship hull assembly, a huge number of screws, brackets, fasteners and other small parts must be attached to the frame. Traditionally, each part is printed out from the 3-D computer design file to a paper document that lists its spatial coordinates as well as a part description and other non-geometric information. Placement of each part typically requires tedious manual copying, coordinate measuring and marking using expensive templates, and the process remains time-consuming and error-prone. Laser projection is a technique which is commonly used in the industry to simplify the assembly process. Laser projectors display precise outlines, templates, patterns or other shapes on virtually all surfaces by projecting laser lines. The system for reproducing virtual objects in the above embodiment can also do the same job.

Figure 23D:
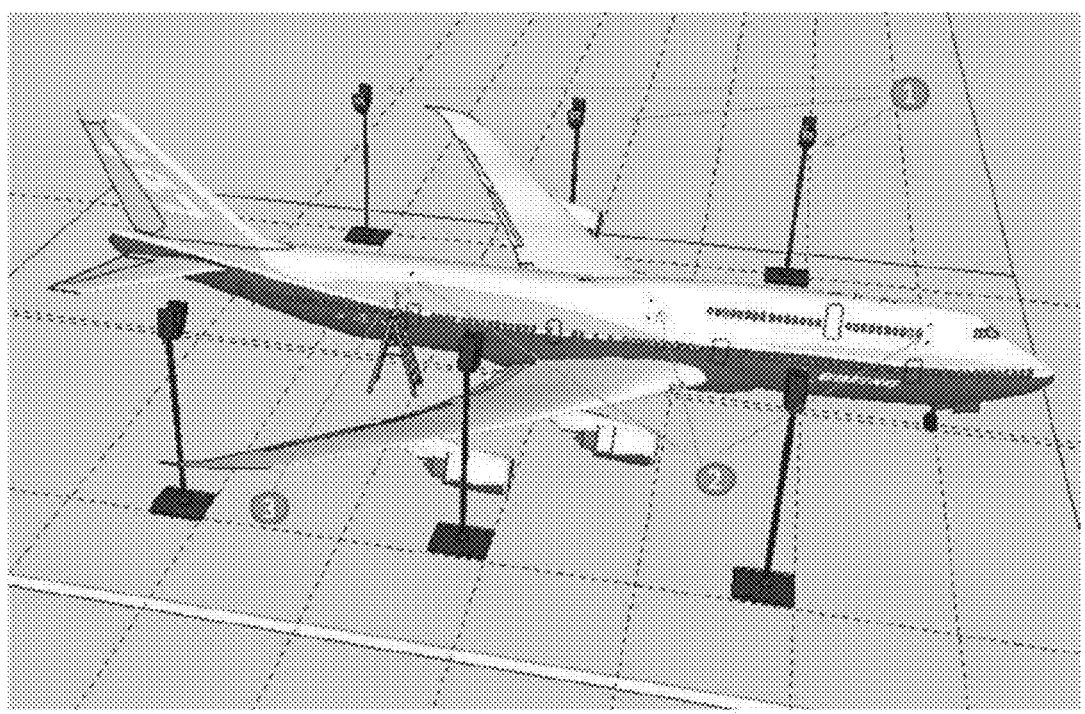
FIG. 23D illustrates a system according to another embodiment of the present patent application being applied in computer aided assembly.

FIG. 23D illustrates a system according to another embodiment of the present patent application being applied in computer aided assembly. Referring to FIG. 23D, the system includes a host device 1, a calibration mark 2, and a user 3 with a detector device to assemble the parts on the aircraft frame.

Using the 3D reproduction technique described in the previous section, the whole CAD assembly template can be reproduced on the aircraft frame and the workers can follow the instructions on the detector device to assemble the appropriate parts on the aircraft frame at the positions pointed by the detector device or paint the aircraft.

Automatic Optical Inspection (AOI)

AOI is an automated visual inspection of a wide range of products, such as printed circuit boards (PCBs). In case of PCB-inspection, a camera autonomously scans the device under test (DUT) for a variety of surface feature defects such as scratches and stains, open circuits, short circuits, thinning of the solder as well as missing components, incorrect components, and incorrectly placed components. The system described below can make sure the same AOI concept on checking the missing assembly component or improper installation of the component can be implemented.

Figure 23E:
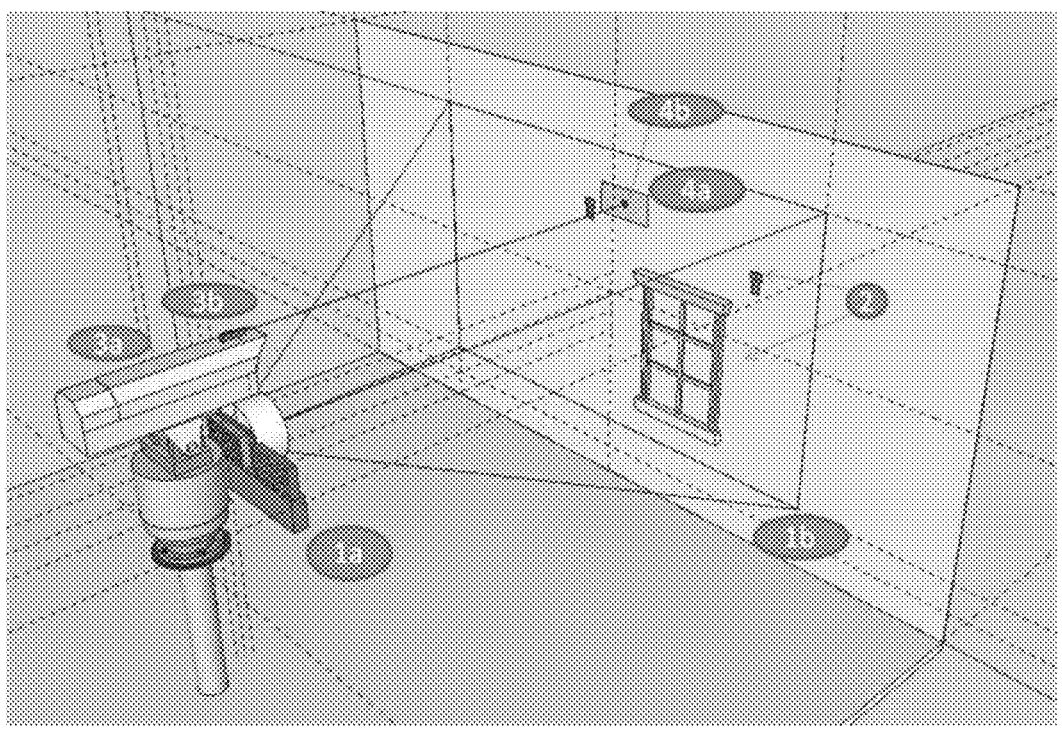
FIG. 23E illustrates a system according to another embodiment of the present patent application being applied in automatic optical inspection.

FIG. 23E illustrates a system according to another embodiment of the present patent application being applied in automatic optical inspection. Referring to FIG. 23E, the system includes a host device 1a having a FOV 1b, assembled components 2, an AOI camera 3a being mounted on a computer controlled platform which can perform PAN and Tilt action, and a laser pointer 3b (single or multiple laser beams) being mounted on the AOI camera 3a and pointing to a direction that is parallel to the optical axis of the AOI camera. The AOI camera's FOV is 4a. The laser spot is reproduced on the surface from the laser pointer 3b.

The operation of the system is described as below. When all the components have been installed on the installation surface covered by the host device's FOV, the computer unit starts to navigate the FOV of the AOI camera to scan the installation surface by controlling the Pan and Tilt action of the AOI platform and using the laser pointer as the coordination feedback. The scanning process can start from the top left corner to the bottom right corner of the host device's FOV or in any sequence as long as the scanning covers the whole inspection object. During the scanning process, a much higher resolution image is taken by the AOI camera, together with the coordination provided by the laser pointer of the AOI camera. The computer unit can analyze the real object in the image taken by the AOI camera with the virtual object (the intended installation object) in the CAD data to find out any mismatch between the actual installation and the CAD data.

Figure 23F:
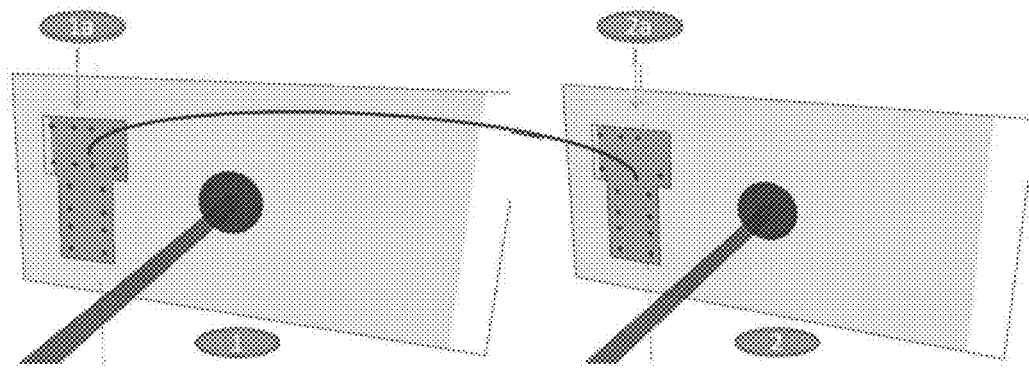
FIG. 23F illustrates an example of the images being processed in the operation of the system depicted in FIG. 23E.

FIG. 23F illustrates an example of the images being processed in the above operation. Referring to FIG. 23F, the image 1 is the virtual image in the CAD data while the object 1a is the bracket in the CAD data. The image 2 is the image captured by the AOI camera while the object 2a is the bracket in the real surface. The computer can find the missing screws in the object 2a by comparing the object 2a with the object 1a.

If the inspection object in the image captured by the host device has a resolution high enough to be compared with the feature in the CAD data, then AOI can be performed without the AOI camera.

Application: Virtual Projector

Figure 23G:
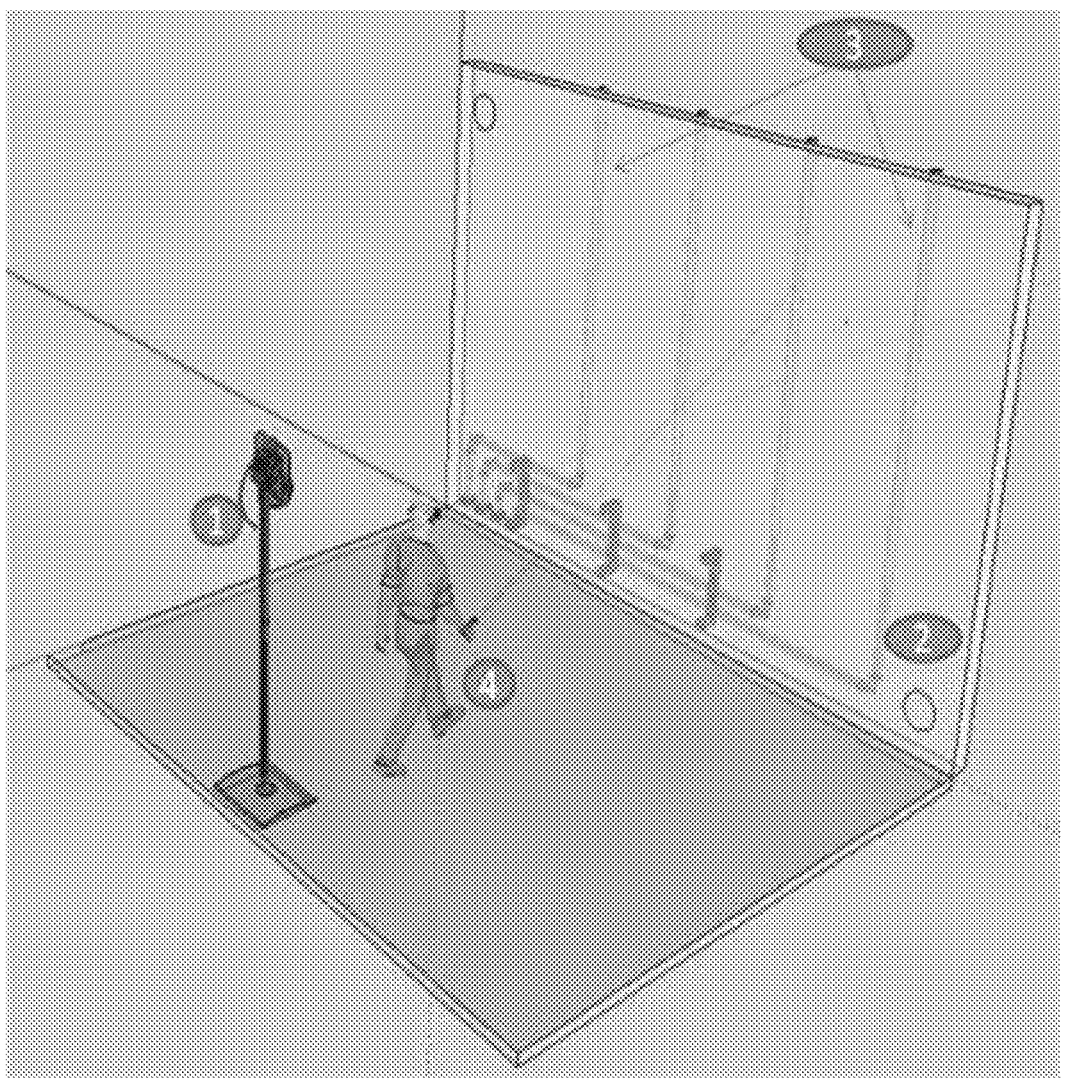
FIG. 23G illustrates a system according to another embodiment of the present patent application being used as a virtual projector.
Figure 23H:
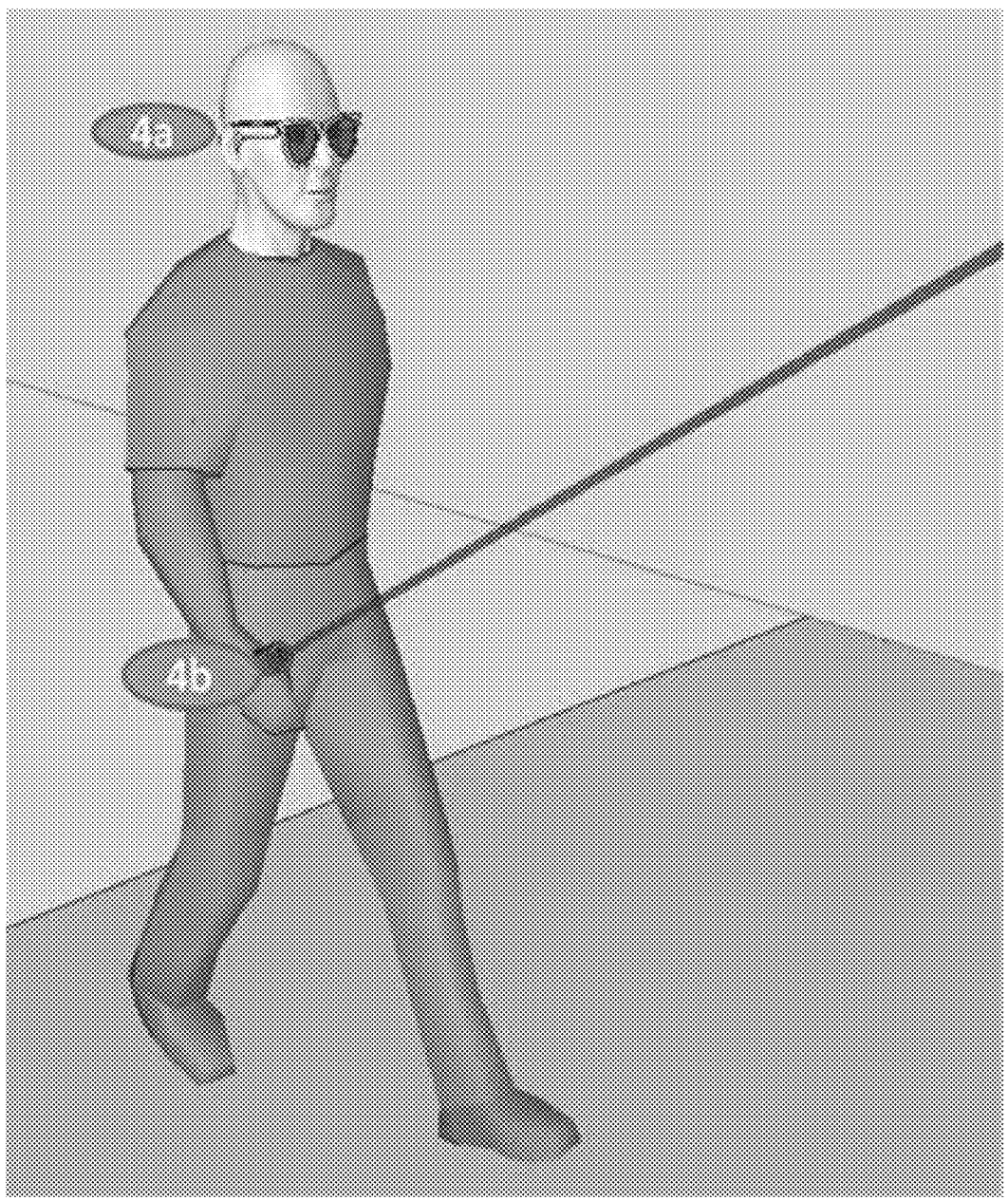
FIG. 23H illustrates the detector device in the system depicted in FIG. 23G.

The system for reproducing virtual objects in the above embodiments can be used as a virtual projector which displays the hidden object behind the surface. FIG. 23G illustrates a system according to another embodiment of the present patent application being used as a virtual projector. Referring to FIG. 23G, the system includes a host device 1, a wall 2, an object 3 behind the wall 2, and a user carrying a detector device 4. The detector device 4 includes a head-up-display 4a that displays information from host device 1 and a laser pointer 4b that is configured to produce a tracking pattern of the detector device 4. FIG. 23H illustrates the detector device 4.

The operation of the system is as follows.
1. The user points the laser pointer 4b to the wall.
2. The host device 1 detects the tracking pattern produced by the laser pointer 4b from the captured image and calculates the coordinate with respect to the CAD data. It is assumed the hidden object 3 information is already in the CAD data)
3. The host device sends the hidden object's image from the CAD data pointed by the laser pointer 4b to the head-up-display so that user can "see" the hidden object 3 behind the wall 2.

Application: Displacement Measurement

Figure 24:
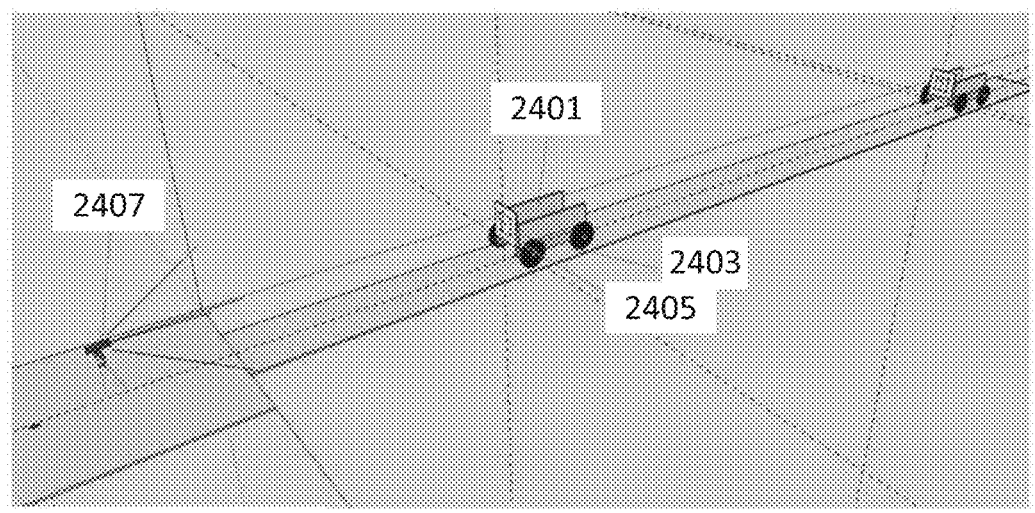
FIG. 24 illustrates a system for reproducing virtual objects according to an embodiment of the present patent application being applied to the measurement of the displacement of a target with respected to an optical center.

The system for reproducing virtual objects in the above embodiment can be applied to the measurement of the displacement of a target with respected to an optical center. FIG. 24 illustrates such operation. Referring to FIG. 24, the user becomes a carrier 2401 to carry a target (the wall 2403 and the detector device with the tracking pattern 2405 being fixedly attached with each other). The carrier 2401 moves toward the host device (the host camera 2407) along the optical axis. The carrier 2401 can start from the far end. The host device then does an initial calibration by moving the host device on a tripod such that the optical center of the host device is aligned to the center of the target. Then the carrier 2401 starts to move toward the host device at a predefined speed. As the carrier moves, the host device will change its focal length so that the target is always within the FOV of the host device. As a result, a sequence of images (frames) can be recorded by the host device, and those frames can also be linked to the distance of the target with respected to the host device by using a distance measurement device such as GPS, laser distant measurement device or a distance estimated by the focal length and the image size and etc. On each frame, the following is known:
1. The distance between the target and the host device;
2. The offset between the target center and the optical center of the host device.

Figure 25A:
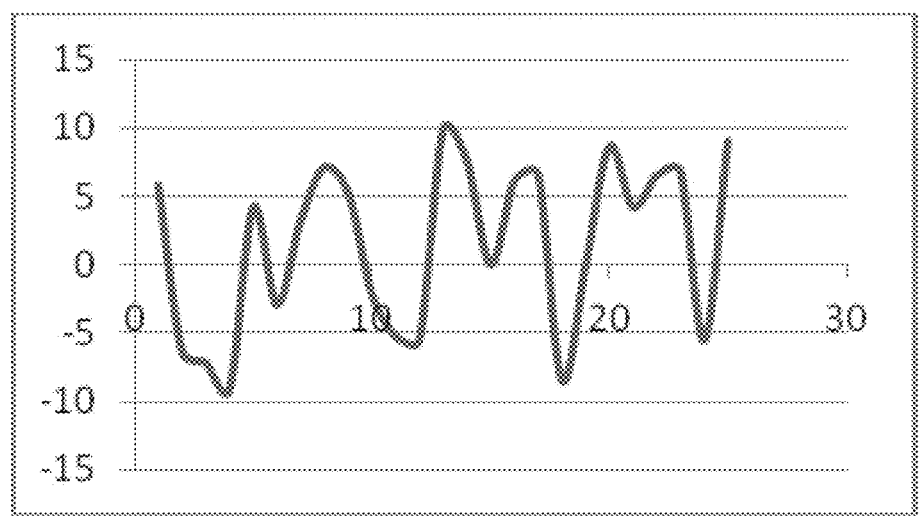
FIG. 25A illustrates a plot of the offset (Y-axis) versus the distance between the target and the host device (X-axis) generated by the system depicted in FIG. 24.

A plot of the offset (Y-axis) versus the distance between the target and the host device (X-axis) reveals the surface roughness of the road on which that the carrier 2401 travels. FIG. 25A illustrates an example of the plot.

Figure 25B:
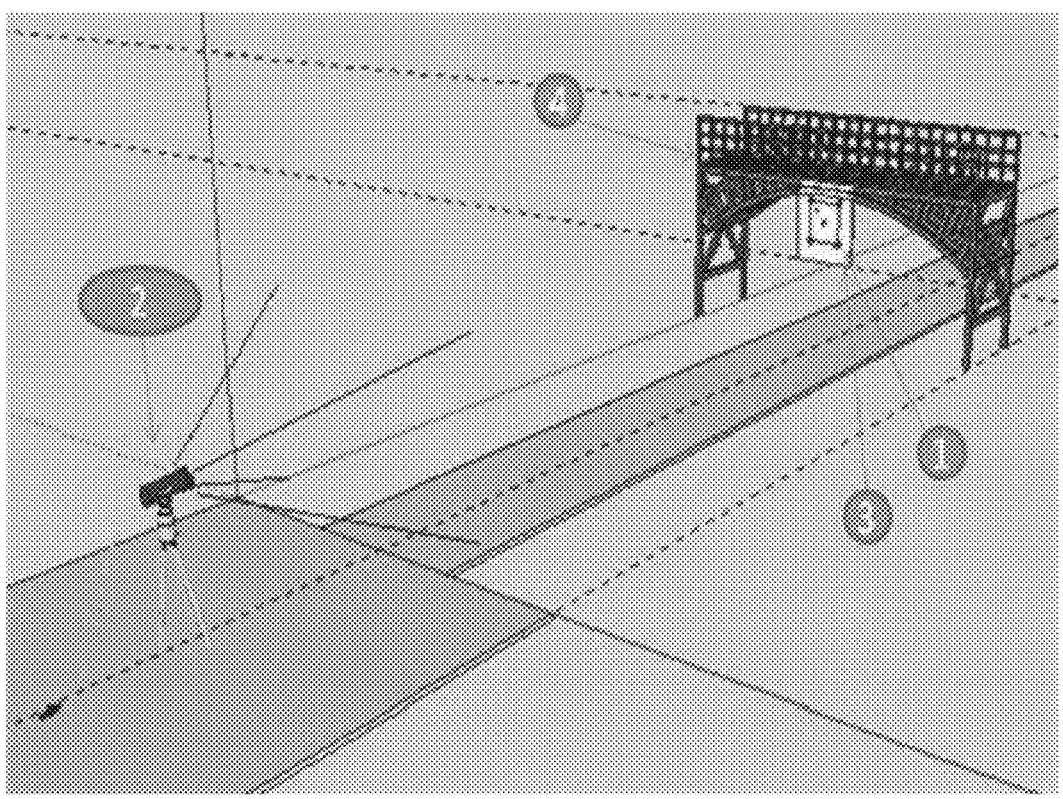
FIG. 25B illustrates a system for reproducing virtual objects according to an embodiment of the present patent application being applied to the measurement vibration of a stationary object.

The system for reproducing virtual objects in the above embodiment can be applied to the measurement of vibration of a stationary object, as illustrated in FIG. 25B. Referring to FIG. 25B, now assuming the user 4 becomes a bridge to carry a target (the wall 1 and the detector device with the tracking pattern 3). The host device's FOV is adjusted to capture the whole tracking target. Then a sequence of image (frame) can be recorded by the host device, and those frames are linked to real time.

Figure 25C:
FIG. 25C illustrates a plot generated by the system depicted in FIG. 25B.

Now, on each frame we know the offset between the target center and the optical center of the host device. Then we can plot the offset (Y-Axis) Vs. Real Time, which represents the vibration or drift of the bridge with respected to the real time. FIG. 25C illustrates an example of the plot.

While the present patent application has been shown and described with particular references to a number of embodiments thereof, it should be noted that various other changes or modifications may be made without departing from the scope of the present invention.

What is claimed is:

1. A system for reproducing a virtual object without using a projector comprising:
   a detector comprising:
      a tracking object that carries a known tracking pattern and moves on a surface; and
      a reconstruction device which allows a user to mark on the surface; and
   a host device comprising:
      a host camera capturing an image on the surface;
      a host computer connected with the host camera and storing a template pattern corresponding to a virtual object; and
      a communication unit communicating with the detector;
   wherein the host device captures and detects the tracking pattern by the host camera, transforms the tracking pattern to a virtual tracking object in a virtual space, manipulates the virtual object in the virtual space, and superpositions the virtual tracking object and the virtual object;
   wherein the host device triggers the reconstruction device to reproduce the virtual object into a real physical object on the surface when coordinates of the virtual tracking object equal or approach to coordinates of the virtual object; and
   wherein the tracking object comprises a movable tracking object, and a set of stationary tracking objects is provided on the surface.

2. The system for reproducing the virtual object without using a projector of claim 1, wherein the tracking object comprises a button for the user to push and mark on the surface.

3. The system for reproducing the virtual object without using a projector of claim 2, further comprising a communication device, the communication device is a mobile device or computer being configured to receive the information transmitted from the host device and to pass the information to the user.

4. The system for reproducing the virtual object without using a projector of claim 1, wherein the host device is further configured to transmit properties of the virtual object to the user, the properties being related to a relative position of the virtual tracking pattern relative to the virtual object.

5. The system for reproducing the virtual object without using a projector of claim 4, wherein the properties comprise type, coordinates, dimension, material, color or texture.

6. The system for reproducing the virtual object without using a projector of claim 1, wherein the host device is configured to transform the tracking pattern to the virtual tracking object represented by a matrix.

7. The system for reproducing the virtual object without using a projector of claim 6, wherein the host device is configured to scale, rotate or relocate the virtual object in the virtual space in manipulating the virtual object.

8. The system for reproducing the virtual object without using a projector of claim 7, wherein the host device is configured to manipulate the virtual object based on a user's perception.

9. The system for reproducing the virtual object without using a projector of claim 7, wherein the host device is configured to manipulate the virtual object based on systematic calibration.

10. The system for reproducing the virtual object without using a projector of claim 1, wherein the host device further comprises a calibration sensor configured to provide additional information to the host computer, and the calibration sensor is a GPS unit, a level sensor, a gyroscope, a proximity sensor, or a distance sensor.

11. The system for reproducing the virtual object without using a projector of claim 1 further comprising a plurality of the detectors, wherein each of the detectors is configured to communicate between the host device and one of a plurality of users so that the users can collectively reproduce the virtual object on the surface.

12. The system for reproducing the virtual object without using a projector of claim 1, wherein the tracking pattern comprises a first tracking feature for the system to find the detector from a whole captured image in real time; and a second tracking feature for the system to estimate a fine position of the detector.

13. The system for reproducing the virtual object without using a projector of claim 12, wherein the first tracking feature is an AR (Augmented Reality) mark and the second tracking feature is a PCB (Printed Circuit Board) fiduciary mark.

14. A system for reproducing a virtual object without using a projector comprising:
a detector comprising:
a tracking object that carries or produces a tracking pattern and moves on a surface;
a reconstruction device; and
a communication device; and
a detector carrier that carries the detector; and
a host device comprising:
an optical system configured to capture light in a predetermined frequency spectrum;
a digital light sensor configured to sense light within the predetermined frequency spectrum;
a host computer storing a template pattern corresponding to a virtual object; and
a communication unit communicating with the communication device of the detector;
wherein the host device captures and detects the tracking pattern by the optical system, transforms the tracking pattern to a virtual tracking object in a virtual space, manipulates the virtual object in the virtual space, and superpositions the virtual tracking object and the virtual object;
wherein the host device triggers the reconstruction device to reproduce the virtual object into a real physical object on the surface when coordinates of the virtual tracking object equal or approach to coordinates of the virtual object;
wherein the host device controls the reconstruction device through controlling a navigation of the detector carrier; and
wherein the tracking object comprises a movable tracking object, and a set of stationary tracking objects is provided on the surface.

15. The system for reproducing the virtual object without using a projector of claim 14, wherein the tracking pattern is a colored dot, and the host device is configured to transform the colored dot to a zero dimensional object in a virtual space.

16. The system for reproducing the virtual object without using a projector of claim 14, wherein the tracking pattern is a passive pattern that reflects ambient light or light emitted from a light source, or an active pattern configured to emit light.

17. A method for reproducing a virtual object without using a projector comprising:
capturing an image on a surface;
detecting a tracking pattern on the surface, the tracking pattern being carried by a tracking object;
transforming the tracking pattern to a virtual tracking object in a virtual space;
manipulating a virtual object in the virtual space;
superpositioning the virtual tracking object and the virtual object; and
reproducing the virtual object into a real physical object on the surface when coordinates of the virtual tracking object equal or approach to coordinates of the virtual object;
wherein the above steps are carried out without using a projector; and
wherein the tracking object comprises a movable tracking object, and a set of stationary tracking objects is provided on the surface.

18. The method for reproducing a virtual object without using a projector of claim 17, further comprising:
scaling, rotating or relocating the virtual object in the virtual space during manipulating the virtual object in the virtual space.

19. The method for reproducing a virtual object without using a projector of claim 17, wherein the tracking pattern comprises a passive pattern that reflects ambient light or light emitted from a light source, or an active pattern configured to emit light.

20. The method for reproducing a virtual object without using a projector of claim 17, further comprising:
transmitting properties of the virtual object to a user, the properties of the virtual object being related to a relative position of the virtual tracking pattern relative to the virtual object.

* * * * *